(12) United States Patent
Kawakami et al.

(10) Patent No.: US 9,167,231 B2
(45) Date of Patent: Oct. 20, 2015

(54) SYSTEM AND METHOD FOR CALIBRATING A STEREOSCOPIC CAMERA BASED ON MANUAL ALIGNMENT OF TEST IMAGES

(75) Inventors: Tomohisa Kawakami, Kyoto (JP); Tsutomu Araki, Kyoto (JP); Takeshi Nishikawa, Kyoto (JP); Fumihiko Inoue, Kyoto (JP); Daigo Shimizu, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 411 days.

(21) Appl. No.: 13/404,562

(22) Filed: Feb. 24, 2012

(65) Prior Publication Data

US 2012/0218388 A1 Aug. 30, 2012

(30) Foreign Application Priority Data

Feb. 24, 2011 (JP) ................................. 2011-038984

(51) Int. Cl.
*H04N 13/02* (2006.01)
*G06T 7/00* (2006.01)
*H04N 13/00* (2006.01)

(52) U.S. Cl.
CPC ....... *H04N 13/0239* (2013.01); *H04N 13/0022* (2013.01); *G06T 7/0022* (2013.01); *H04N 13/0055* (2013.01); *H04N 13/0296* (2013.01); *H04N 2013/0081* (2013.01)

(58) Field of Classification Search
CPC .......... H04N 13/0239; H04N 13/0296; H04N 13/0055; H04N 2013/0081; G06T 7/0022
USPC .................................................... 348/47, 43
See application file for complete search history.

(56) References Cited

U.S. PATENT DOCUMENTS

2009/0237490 A1* 9/2009 Nelson, Jr. ...................... 348/43

FOREIGN PATENT DOCUMENTS

| JP | 07-087385 | 3/1995 |
|----|-----------|--------|
| JP | 08-317424 | 11/1996 |
| JP | 10-307352 | 11/1998 |
| JP | 2000-078615 | 3/2000 |
| JP | 2005-017286 | 1/2005 |
| JP | 2005-110120 | 4/2005 |
| JP | 2005-130312 | 5/2005 |

(Continued)

OTHER PUBLICATIONS

JuicyBits, 3D Camera for iPhone, uploaded Aug. 24, 2009 (available at https://www.youtube.com/watch?v=qJu9kRhFM98) (PDF of screenshot included).*

(Continued)

*Primary Examiner* — Gims Philippe
*Assistant Examiner* — Benjamin Pezzner
(74) *Attorney, Agent, or Firm* — Nixon & Vanderhye PC

(57) ABSTRACT

A first temporary taken image taken by a first imaging section of a stereo imaging section, and a second temporary taken image taken by a second imaging section of the stereo imaging section are displayed on a display section. A user aligns the display position of the first temporary taken image with the display position of the second temporary taken image, by moving the first temporary taken image displayed on the display section. Based on the result of the movement, the display positions of two images composing a stereo image taken with the stereo camera are corrected, and the stereo image is displayed on the display section in a stereoscopically visible manner.

20 Claims, 12 Drawing Sheets

(56) References Cited

FOREIGN PATENT DOCUMENTS

JP 2006-270265 10/2006
JP 2010-237582 10/2010

OTHER PUBLICATIONS

Abstract and English-language machine translation of JP 2005-110120 (22 pages).
Abstract and English-language machine translation of JP 2005-130312 (34 pages).
Abstract and English-language machine translation of JP 07-087385 (13 pages).
Abstract and English-language machine translation of JP 08-317424 (22 pages).
Abstract and English-language machine translation of JP 2000-078615 (11 pages).
Abstract and English-language machine translation of JP 2006-270265 (16 pages).
Abstract and English-language machine translation of JP 2010-237582 (29 pages).

* cited by examiner

SYSTEM AND METHOD FOR CALIBRATING A STEREOSCOPIC CAMERA BASED ON MANUAL ALIGNMENT OF TEST IMAGES

CROSS REFERENCE TO RELATED APPLICATION

The disclosure of Japanese Patent Application No. 2011-038984, filed on Feb. 24, 2011, is incorporated herein by reference.

FIELD

The exemplary embodiments relate to a computer-readable storage medium having stored therein an information processing program, an imaging apparatus, an imaging method, and an imaging system, and more specifically, to a computer-readable storage medium having stored therein an information processing program, an imaging apparatus, an imaging method, and an imaging system that are capable of performing stereo imaging.

BACKGROUND AND SUMMARY

In order to generate a stereoscopically visible image with a stereo camera (stereo imaging), it is desirable that the focal distances of the two cameras or the optical positions such as the attachment positions are accurately aligned with each other. However, in practice, the optical positions of both cameras are not always aligned, and therefore, two images taken by both cameras (stereo image) include display error due to the difference between the optical positions of the stereo camera. Therefore, an optimum stereoscopically visible image that provides a depth feeling or a protrusion feeling cannot be displayed unless the error is corrected so as to appropriately adjust the display positions of both images (stereo image).

In addition, in conventional correction methods, an image for adjustment (adjustment pattern) is to be prepared. Therefore, even though distributers may be able to perform such adjustment (correction) in manufacturing or shipping, it is difficult for a user to perform the adjustment by using that method. Meanwhile, owing to outer shock to the apparatus when used, aging, or the like, the installation position (optical position) of the stereo camera can change. In such a case, a correction method for a user to easily perform the adjustment is desired to be provided.

Therefore, a feature of the exemplary embodiments provides a computer-readable storage medium having stored therein information processing program, and the like that allow a user to easily adjust the display positions of two images composing a stereo image even if the optical position of an imaging section (stereo camera) has changed owing to outer shock to the apparatus when used, aging, or the like.

The exemplary embodiments have the following aspects in order to solve the above problems.

One aspect of the exemplary embodiments is a computer-readable storage medium having stored therein an information processing program which is executed by a computer of an imaging apparatus that takes an image of a subject by a stereo imaging section to acquire a stereoscopically visible taken image and that includes a storage section. The information processing program causes the computer to function as: a temporary taken image acquiring section, a temporary taken image display section, an input accepting section, a display position changing section, a correction value calculation section, and a storage control section. The temporary taken image acquiring section takes an image of a given imaging target by the stereo imaging section, and acquires an image taken by a first imaging section of the stereo imaging section, as a first temporary taken image, and an image taken by a second imaging section of the stereo imaging section, as a second temporary taken image. The temporary taken image display section displays the first temporary taken image and the second temporary taken image on a display section. The input accepting section accepts an input from a user. The display position changing section changes at least one of the display positions of the first temporary taken image and the second temporary taken image, based on a predetermined input accepted by the input accepting section. The correction value calculation section calculates a correction value for correcting at least one of the display positions of images taken by the first imaging section and the second imaging section on the display section, based on displacement, by the changing, of the at least one of the display positions of the first temporary taken image and the second temporary taken image that has been changed by the display position changing section. The storage control section stores, in the storage section, the correction value calculated by the correction value calculation section without associating the correction value with the first temporary taken image and the second temporary taken image.

According to the above aspect, adjustment is performed based on the first temporary taken image and the second temporary taken image (adjustment images) acquired by taking images of a given imaging target (subject) with a stereo camera composed of the first imaging section and the second imaging section. Therefore, a user can acquire adjustment images by taking images of a desired imaging target with the stereo camera, and does not need to separately prepare a pattern image of the like for adjustment. In addition, based on a predetermined input from a user (a user's operation for moving at least one of the adjustment images), the display positions of the adjustment images displayed on the display section (for example, the display screen of the stereo camera) are changed. Therefore, a user can move the adjustment images to a desired position while confirming the display screen. In addition, based on displacement of the display position of the adjustment image changed based on an operation by a user, the correction value for correcting the display position of a stereo image (composed of two images taken with the stereo camera) to be displayed in a stereoscopically visible manner on the display surface is calculated, and the calculated correction value is stored in the storage section. Therefore, a user only has to do simple image adjustment (move adjustment images), in order to calculate the correction value for appropriate adjustment of the display position of a stereo image and store the correction value in the storage section.

In another aspect, the computer may be caused to function as a correction section and a stereoscopic display control section. The correction section, based on the correction value, may correct the display position, on the display section, of at least one of a first image taken by the first imaging section and a second image taken by the second imaging section which are taken separately from the first temporary taken image and the second temporary taken image. The stereoscopic display control section may display the first image and the second image on the display section in a stereoscopically visible manner, based on a correction result by the correction section.

According to the above aspect, based on the correction value, the display positions of the first image and the second image (stereo image) on the display section (display screen) are corrected, and based on the correction result, the stereo image is displayed on the display screen in a stereoscopically visible manner. Therefore, a user only has to do simple image adjustment (move adjustment images), in order to appropriately adjust the display position of a stereo image and appropriately display the stereo image on the display screen in a stereoscopically visible manner.

In another aspect, the calculation by the correction value calculation section may be performed as follows. That is, the correction value calculation section may calculate the correction value, based on only displacement in the vertical direction of the at least one of the display positions of the first temporary taken image and the second temporary taken image.

According to the above aspect, although displacement by movement of the display position of the first temporary taken image and/or the second temporary taken image (adjustment images) includes displacements in various directions, the correction value is calculated based on only displacement in the vertical direction (the y-axis direction shown in FIGS. 1, 5, and the like described later) of the adjustment images. Thus, the correction value is calculated as a value for correcting displacement of the position of a stereo image (displacement in the vertical direction between the positions of the first image and the second image) that is a main cause of recognition of the stereo image as two images displaced from each other. In addition, if the adjustment images can be moved also in directions other than the vertical direction by a user, it becomes possible to substantially overlap the first temporary taken image and the second temporary taken image with each other. As a result, it becomes easy to align (adjust) the display positions of the first temporary taken image and the second temporary taken image with respect to the vertical direction and to calculate appropriate correction value.

In another aspect, a display parameter for determining the display positions of the first image and the second image on the display section may be stored in the storage section. In this case, the temporary taken image display section may display the first temporary taken image and the second temporary taken image on the display section, based on the display parameter. The correction section may correct at least one of the display positions of the first image and the second image on the display section, based on the display parameter corrected based on the correction value.

According to the above aspect, the display parameter for determining the display position of a stereo image (first image and second image) to be displayed on the display section (display screen) is stored in the storage section (for example, a main memory). Based on the display parameter, the display position of a stereo image is determined. The display position of a stereo image is corrected by the display parameter being corrected. Therefore, a user can cause a stereo image to be displayed at an appropriate display position on the display screen, in which the correction is reflected (i.e., at the position updated based on the correction).

In another aspect, the computer may be caused to function as a display position determination section and a display adjustment parameter calculation section. The display position determination section may determine at least one of the display positions of the first temporary taken image and the second temporary taken image, based on a determination input accepted by the input accepting section. The display adjustment parameter calculation section may calculate a display adjustment parameter for correcting at least one of the display positions of the first image and the second image on the display section. In this case, the storage control section may update the display parameter to the value of the display adjustment parameter, and stores the updated display parameter in the storage section. The display position changing section may change the display position of the first temporary taken image, based on a first input accepted by the input accepting section. The display position determination section determines the display position of the first temporary taken image to be that changed by the display position changing section, based on the determination input. The display adjustment parameter calculation section may calculate the display adjustment parameter, based on a first displacement which is a displacement between the display position of the first temporary taken image determined by the display position determination section, and the display position of the first temporary taken image as it was before the changing by the display position changing section. The correction section may correct at least one of the display positions of the first image and the second image on the display section, based on the updated display parameter stored in the storage section.

According to the above aspect, if a user performs an operation of indicating that the display position of the first temporary taken image has been aligned with the display position of the second temporary taken image (the adjustment has been completed) (that is, if a user has given a determination input), the display adjustment parameter is calculated based on movement information (information about displacement of the display position) about the first temporary taken image (one of the adjustment images) moved thus far. Then, the display parameter, which determines the display position of a stereo image (first image and second image) to be displayed on the display section (display screen), is updated to the value of the display adjustment parameter. Therefore, a user only has to align (adjust) the display positions of the first temporary taken image (one of the adjustment images) and the second temporary taken image (the other one of the adjustment images) while confirming displacement of the first temporary taken image (the one of the adjustment images) on the display screen, whereby the display parameter can be updated (corrected) to an appropriate value (display adjustment parameter), and a stereo image can be displayed at an appropriate display position based on the updated display parameter.

In another aspect, the changing of the display position by the display position changing section, the determination of the display position by the display position determination section, and the calculation of the display adjustment parameter by the display adjustment parameter calculation section, may be performed as follows. The display position changing section may further change the display position of the second temporary taken image, based on a second input accepted by the input accepting section. The display position determination section may determine the display positions of the first temporary taken image and the second temporary taken image to be those changed by the display position changing section, based on the determination input. The display adjustment parameter calculation section may calculate the display adjustment parameter, based on the first displacement, and a second displacement which is a displacement between the display position of the second temporary taken image determined by the display position determination section, and the display position of the second temporary taken image as it was before the changing by the display position changing section.

According to the above aspect, the first temporary taken image and the second temporary taken image (both adjustment images) can be moved by a user's operation (first input and second input). Therefore, a user can align (adjust) the display positions of both adjustment images by moving both adjustment images. In addition, the display adjustment parameter is calculated based on movement (displacement) information about both adjustment images. Therefore, a user can more easily align the display positions of the adjustment images than a user aligns the display positions of the adjustment images by moving only the first temporary taken image (one of the adjustment images). Based on the adjustment result, a stereo image can be displayed at an appropriate position.

In another aspect, the calculation of the display adjustment parameter by the display adjustment parameter calculation section may be performed as follows. The display adjustment parameter calculation section may calculate the display adjustment parameter, based on a relative displacement of the first displacement with respect to the second displacement.

According to the above aspect, while the first temporary taken image and the second temporary taken image (both adjustment images) can be moved by a user's operation (first input and second input), relative displacement of the first temporary taken image with respect to the second temporary taken image (displacement of one of the adjustment images from the other one) is used for calculation of the display adjustment parameter. Therefore, when a user aligns the display positions of the adjustment images, the user can more easily align (adjust) the display positions of the adjustment images by moving both adjustment images. In addition, the calculation of the display adjustment parameter in this case can be performed similarly to the calculation performed when the second temporary taken image is fixed and only the first temporary taken image is moved (that is, only one of the adjustment images is moved). Therefore, the display adjustment parameter can be easily calculated.

In another aspect, the calculation of the display adjustment parameter by the display adjustment parameter calculation section may be performed as follows. The display adjustment parameter calculation section may calculate the display adjustment parameter, based on only a displacement in the vertical direction of the first displacement.

According to the above aspect, although displacement (the first displacement) by movement of the display position of the first temporary taken image includes displacements in various directions, only displacement in the vertical direction (the y-axis direction shown in FIGS. 1, 5, and the like described later) is used for calculation of the display adjustment parameter. Thus, displacement in the vertical direction of the position of a stereo image (the first image and the second image) that is a main cause of recognition of the stereo image as two images displaced from each other, is corrected. In addition, while only displacement in the vertical direction is used for calculation of the display adjustment parameter, if the first temporary taken image (one of the adjustment images) can be moved also in directions other than the vertical direction by a user, it becomes possible to substantially overlap the first temporary taken image and the second temporary taken image with each other. As a result, it becomes easy to align (adjust) the display positions of the first temporary taken image and the second temporary taken image with respect to the vertical direction.

In another aspect, the calculation of the display adjustment parameter by the display adjustment parameter calculation section may be performed as follows. The display adjustment parameter calculation section may calculate the display adjustment parameter, based on only a displacement in the vertical direction of the first displacement and a displacement in the vertical direction of the second displacement.

According to the above aspect, although displacement (the first displacement and the second displacement) by movement of the display position of each of the first temporary taken image and the second temporary taken image includes displacements in various directions, only displacements in the vertical direction (the y-axis direction shown in FIGS. 1, 5, and the like described later) of the temporary taken images are used for calculation of the display adjustment parameter. Thus, displacement in the vertical direction of the position of a stereo image (the first image and the second image) that is a main cause of recognition of the stereo image as two images displaced from each other, is corrected. In addition, while only displacement in the vertical direction is used for calculation of the display adjustment parameter, if the first temporary taken image and the second temporary taken image (both adjustment images) can be moved also in directions other than the vertical direction by a user, it becomes possible to substantially overlap the first temporary taken image and the second temporary taken image with each other. As a result, it becomes easy to align (adjust) the display positions of the first temporary taken image and the second temporary taken image with respect to the vertical direction.

In another aspect, the storage control by the storage control section, the calculation of the display adjustment parameter by the display adjustment parameter calculation section, the stereoscopically display control by the stereoscopic display control section, may be performed as follows. The storage control section may store, in the storage section, the display position of the first temporary taken image changed by the display position changing section, every time the input accepting section accepts the first input. When the input accepting section has accepted a switching input, the display adjustment parameter calculation section may calculate the display adjustment parameter, based on a third displacement which is a displacement between the display position of the first temporary taken image stored in the storage section, and the display position of the first temporary taken image as it was before the changing by the display position changing section; and the stereoscopic display control section may display the first image and the second image on the display section in a stereoscopically visible manner, based on the calculated display adjustment parameter.

According to the above aspect, every time the display position of the first temporary taken image (one of the adjustment images) is changed by a user's operation, the changed display position is stored in the storage section, the display adjustment parameter is calculated based on the stored display position, and a stereo image (first image and second image) is displayed in a stereoscopically visible manner, based on the calculated display adjustment parameter. Therefore, when a user is adjusting the display position of the first temporary taken image (one of the adjustment image) (that is, during the adjustment), the user can actually confirm how the stereo image is displayed in a stereoscopically visible manner by the current adjustment, and can confirm whether or not the current adjustment is appropriate, before ending (determining) the adjustment.

In another aspect, the storage control by the storage control section, the calculation of the display adjustment parameter by the display adjustment parameter calculation section, the stereoscopically display control by the stereoscopic display control section, may be performed as follows. The storage control section may further store, in the storage section, the display position of the second temporary taken image changed by the display position changing section, every time the input accepting section accepts the second input. When the input accepting section has accepted the switching input, the display adjustment parameter calculation section may calculate the display adjustment parameter, based on the third displacement and a fourth displacement which is a displacement between the display position of the second temporary taken image stored in the storage section, and the display position of the second temporary taken image as it was before the changing by the display position changing section; and the stereoscopic display control section may display the first image and the second image on the display section in a stereoscopically visible manner, based on the calculated display adjustment parameter.

According to the above aspect, every time each of the display positions of the first temporary taken image and the second temporary taken image (both adjustment images) is changed by a user's operation, the changed display position is stored in the storage section, the display adjustment parameter is calculated based on the stored display positions, and a stereo image (first image and second image) is displayed in a stereoscopically visible manner, based on the calculated display adjustment parameter. Therefore, when a user is adjusting the display position of the first temporary taken image and the second temporary taken image (both adjustment images) (that is, during the adjustment), the user can actually confirm how the stereo image is displayed in a stereoscopically visible manner by the current adjustment, and can confirm whether or not the current adjustment is appropriate, before ending (determining) the adjustment.

In another aspect, display of the temporary taken image by the temporary taken image display section may be performed as follows. The temporary taken image display section may display the first temporary taken image and the second temporary taken image on the display section such that at least one of the first temporary taken image and the second temporary taken image is displayed in a translucent manner.

According to the above aspect, the first temporary taken image and the second temporary taken image (both adjustment images) are displayed on the display section such that at least one of the temporary taken images is displayed in a translucent manner. Therefore, a user can easily view displacement between the two images. In addition, since the adjustment images have increased visibility, a user can intuitively and easily align (adjust) the display position of the first temporary taken image (one of the adjustment images) with the display position of the second temporary taken image (the other one of the adjustment images) by changing the display position of the first temporary taken image.

In another aspect, display of the temporary taken image by the temporary taken image display section may be performed as follows. The temporary taken image display section may display the first temporary taken image and the second temporary taken image on the display section in a planar visible manner.

According to the above aspect, the first temporary taken image and the second temporary taken image (both adjustment images) are displayed on the display screen in a stereoscopically visible manner (that is, the images are displayed such that both images are viewed by each of the right eye and the left eye of a user). Therefore, a user can easily view displacement between the display positions of the adjustment images, and can easily adjust these images.

In another aspect, a default parameter that defines predetermined default display positions of the first image and the second image on the display section may be stored in advance in the storage section. In this case, when the input accepting section has accepted a defaulting input, the storage control section may update the display parameter to the value of the default parameter and store the updated display parameter in the storage section.

According to the above aspect, if a user performs an operation of defaulting the display position (operation of returning the display position of a stereo image to the default setting), the display parameter is changed to the value of the default parameter. Therefore, even when a user has changed (adjusted) the display position of a stereo image, the user can return the display position to the default setting any time.

In another aspect, the changing of the display position by the display position changing section may be performed as follows. The display position changing section may change, in the horizontal direction and the vertical direction, at least one of the display positions of the first temporary taken image and the second temporary taken image, based on the predetermined input.

The above aspect is effective particularly when the first temporary taken image and the second temporary taken image (the adjustment images) are displayed in a planar visible manner. In general, since stereoscopically visible images have parallax therebetween, if the adjustment images are displayed in a planar visible manner, the adjustment images are displayed being displaced from each other in the horizontal direction (the x-axis direction shown in FIGS. 1, 5, and the like described later). Therefore, even if displacement between the adjustment images due to the optical position of the stereo camera includes only displacement in the vertical direction (the y-axis direction shown in FIGS. 1, 5, and the like described later), the adjustment images are displayed being displaced also in the horizontal direction. The magnitude of the displacement in the horizontal direction varies depending on the distance between an imaged subject and the stereo camera. Therefore, it may be difficult for a user to perform adjustment for removing displacement in the vertical direction. However, according to the above aspect, since at least one of the adjustment images can be moved also in the horizontal direction, a user does not need to consider the distance between a subject and the stereo camera, and can cause the adjustment images to substantially overlap with each other by moving at least one of the adjustment images in the vertical direction and the horizontal direction. Thus, a user can align (adjust) the display positions of the adjustment images with respect to the vertical direction.

In the above, the exemplary embodiments have been described using a computer-readable storage medium having stored therein an information processing program as an example. However, the exemplary embodiments may be applied to an imaging apparatus, an imaging system, or an imaging method.

According to the exemplary embodiments, it is possible to provide a computer-readable storage medium having stored therein information processing program, and the like that allow a user to easily adjust the display positions of two images composing a stereo image even if the optical position of an imaging section (stereo camera) has changed owing to outer shock to the apparatus when used, aging, or the like.

These and other objects, features, aspects and advantages of the exemplary embodiments will become more apparent from the following detailed description when taken in conjunction with the accompanying drawings.

DETAILED DESCRIPTION OF NON-LIMITING EXAMPLE EMBODIMENTS

Embodiment

Hereinafter, a game apparatus which is an imaging apparatus according to an embodiment will be described. It is noted that the exemplary embodiments are not limited thereto. An imaging system that realizes the function of such an apparatus, an imaging method performed in such an apparatus, or a computer-readable storage medium having stored therein an information processing program to be executed in such an apparatus, may be used.

(External Configuration of Game Apparatus)

Figure 1:
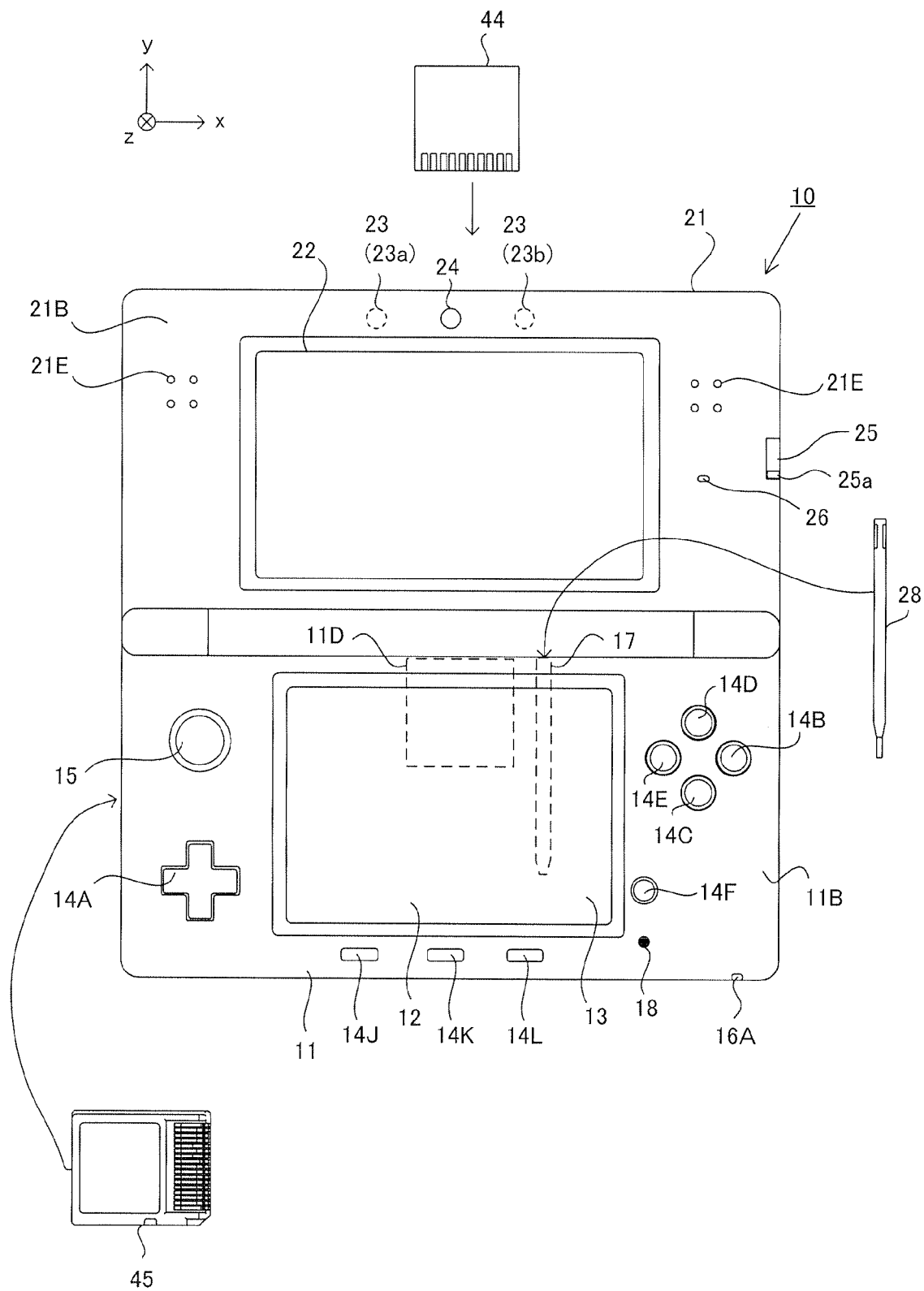
FIG. 1 is a front view showing a non-limiting example of a game apparatus 10 in an opened state.
Figure 2:
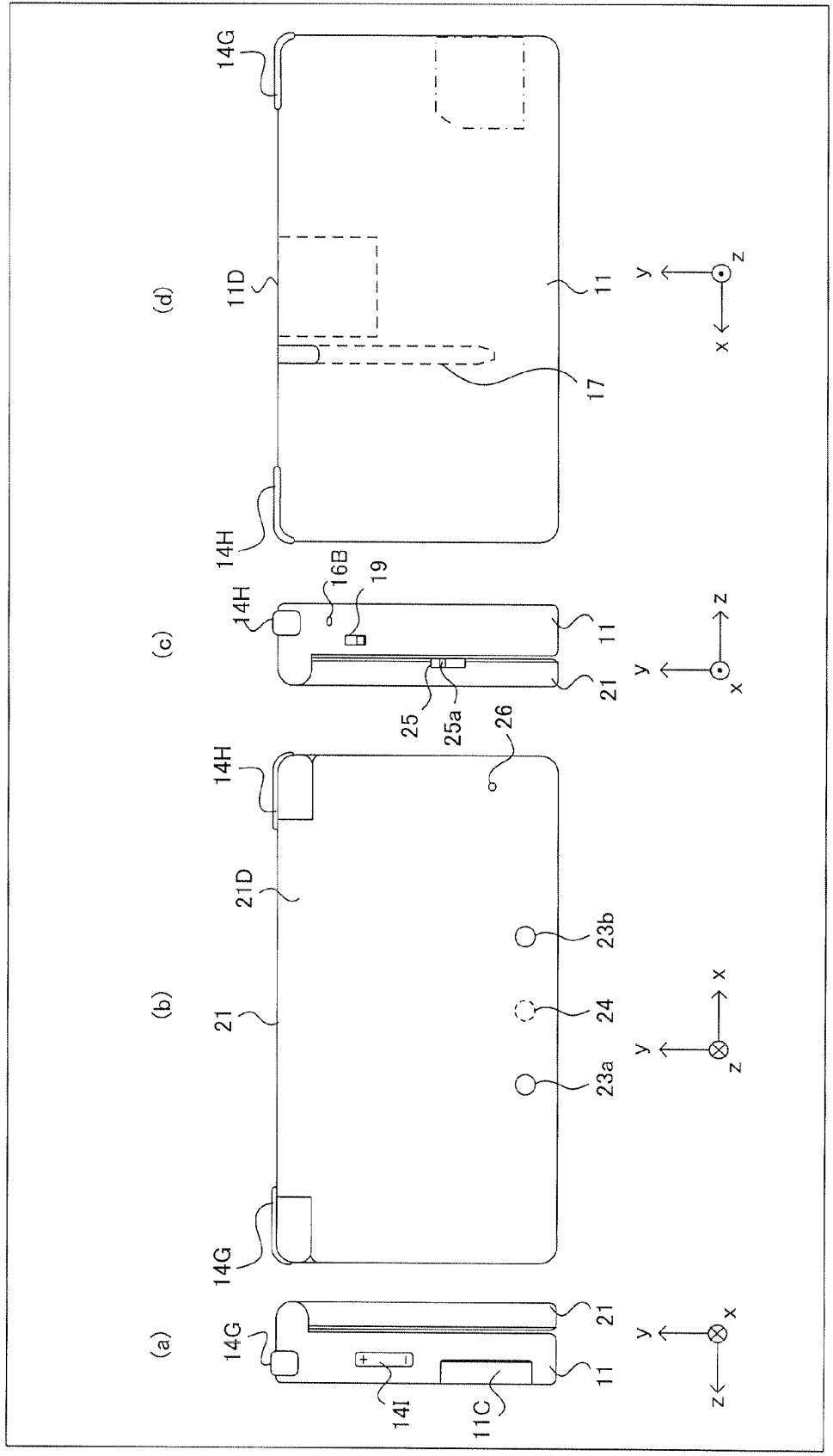
FIG. 2 is a left side view, a front view, a right side view, and a back view showing a non-limiting example of the game apparatus 10 in an closed state.

Hereinafter, the game apparatus according to the present embodiment will be described. FIGS. 1 and 2 are each a plan view of an outer appearance of a game apparatus 10. The game apparatus 10 is a hand-held game apparatus, and is configured to be foldable as shown in FIGS. 1 and 2. FIG. 1 shows the game apparatus 10 in an opened state, and FIG. 2 shows the game apparatus 10 in a closed state. FIG. 1 is a front view of the game apparatus 10 in the opened state. The game apparatus 10 is able to take an image by means of an imaging section, display the taken image on a screen, and store data of the taken image. The game apparatus 10 can execute a game program which is stored in an exchangeable memory card or a game program which is received from a server or another game apparatus, and can display, on the screen, an image generated by computer graphics processing, such as an image taken by a virtual camera set in a virtual space, for example.

First, an external structure of the game apparatus 10 will be described with reference to FIGS. 1 and 2. The game apparatus 10 includes a lower housing 11 and an upper housing 21 as shown in FIGS. 1 and 2. The lower housing 11 and the upper housing 21 are connected to each other so as to be openable and closable (foldable).

(Description of Lower Housing)

First, a structure of the lower housing 11 will be described. As shown in FIGS. 1 and 2, in the lower housing 11, a lower LCD (Liquid Crystal Display) 12, a touch panel 13, operation buttons 14A to 14L, an analog stick 15, an LED 16A and an LED 16B, an insertion opening 17, and a microphone hole 18 are provided. Hereinafter, these components will be described in detail.

As shown in FIG. 1, the lower LCD 12 is accommodated in the lower housing 11. The number of pixels of the lower LCD 12 may be, for example, 320 dots×240 dots (the longitudinal line×the vertical line). The lower LCD 12 is a display device for displaying an image in a planar manner (not in a stereoscopically visible manner), which is different from the upper LCD 22 as described below. Although an LCD is used as a display device in the present embodiment, any other display device such as a display device using an EL (Electro Luminescence), or the like may be used. In addition, a display device having any resolution may be used as the lower LCD 12.

As shown in FIG. 1, the game apparatus 10 includes the touch panel 13 as an input device. The touch panel 13 is mounted on the screen of the lower LCD 12. In the present embodiment, the touch panel 13 may be, but is not limited to, a resistive film type touch panel. A touch panel of any type such as electrostatic capacitance type may be used. In the present embodiment, the touch panel 13 has the same resolution (detection accuracy) as that of the lower LCD 12. However, the resolution of the touch panel 13 and the resolution of the lower LCD 12 may not necessarily be the same. Further, the insertion opening 17 (indicated by dashed line in FIG. 1 and part (d) of FIG. 2) is provided on the upper side surface of the lower housing 11. The insertion opening 17 is used for accommodating a touch pen 28 which is used for performing an operation on the touch panel 13. Although an input on the touch panel 13 is usually made by using the touch pen 28, a finger of a user may be used for making an input on the touch panel 13, in addition to the touch pen 28.

The operation buttons 14A to 14L are each an input device for making a predetermined input. As shown in FIG. 1, among operation buttons 14A to 14L, a cross button 14A (a direction input button 14A), a button 14B, a button 14C, a button 14D, a button 14E, a power button 14F, a selection button 14J, a HOME button 14K, and a start button 14L are provided on the inner side surface (main surface) of the lower housing 11. The cross button 14A is cross-shaped, and includes buttons for indicating an upward, a downward, a leftward, or a rightward direction. The button 14A to 14E, the selection button 14J, the HOME button 14K, and the start button 14L are assigned functions, respectively, in accordance with a program executed by the game apparatus 10, as necessary.

The analog stick 15 is a device for indicating a direction. The analog stick 15 has a top, corresponding to a key, which slides parallel to the inner side surface of the lower housing 11. The analog stick 15 acts in accordance with a program executed by the game apparatus 10. As the analog stick 15, a component which enables an analog input by being tilted by a predetermined amount, in any direction, such as the upward, the downward, the rightward, the leftward, or the diagonal direction, may be used.

In addition, the microphone hole 18 is provided on the inner side surface of the lower housing 11. Under the microphone hole 18, a microphone 42 (see FIG. 3) is provided as a sound input device described below, and the microphone 42 detects for a sound from the outside of the game apparatus 10.

Part (a) of FIG. 2 is a left side view of the game apparatus 10 in the closed state. Part (b) of FIG. 2 is a front view of the game apparatus 10 in the closed state. Part (c) of FIG. 2 is a right side view of the game apparatus 10 in the closed state. Part (d) of FIG. 2 is a rear view of the game apparatus 10 in the closed state. As shown in part (b) and (d) of FIG. 2, an L button 14G and an R button 14H are provided on the upper side surface of the lower housing 11. The L button 14G and the R button 14H act, for example, as shutter buttons (imaging instruction buttons) of the imaging section. Further, as shown in part (a) of FIG. 2, a sound volume button 14I is provided on the left side surface of the lower housing 11. The sound volume button 14I is used for adjusting a sound volume of a speaker of the game apparatus 10.

As shown in part (a) of FIG. 2, a cover section 11C is provided on the left side surface of the lower housing 11 so as to be openable and closable. Inside the cover section 11C, a connector (not shown) is provided for electrically connecting between the game apparatus 10 and an external data storage memory 45. The external data storage memory 45 is detachably connected to the connector. The external data storage memory 45 is used for, for example, recording (storing) data of an image taken by the game apparatus 10.

Further, as shown in part (d) of FIG. 2, an insertion opening 11D through which an external memory 44 having a game program stored therein is inserted is provided on the upper side surface of the lower housing 11. A connector (not shown) for electrically connecting between the game apparatus 10 and the external memory 44 in a detachable manner is provided inside the insertion opening 11D. A predetermined game program is executed by connecting the external memory 44 to the game apparatus 10.

Further, as shown in FIG. 1 and part (c) of FIG. 2, a first LED 16A for notifying a user of an ON/OFF state of a power supply of the game apparatus 10 is provided on the lower side surface of the lower housing 11, and a second LED 16B for notifying a user of an establishment state of a wireless communication of the game apparatus 10 is provided on the right side surface of the lower housing 11. The game apparatus 10 can make wireless communication with other devices, and the second LED 16B is lit up when the wireless communication is established. The game apparatus 10 has a function of connecting to a wireless LAN in a method based on, for example, IEEE802.11b/g standard. A wireless switch 19 for enabling/disabling the function of the wireless communication is provided on the right side surface of the lower housing 11 (see part (c) of FIG. 2).

A rechargeable battery (not shown) acting as a power supply for the game apparatus 10 is accommodated in the lower housing 11, and the battery can be charged through a terminal provided on a side surface (for example, the upper side surface) of the lower housing 11.

(Description of Upper Housing)

Next, a structure of the upper housing 21 will be described. As shown in FIGS. 1 and 2, in the upper housing 21, an upper LCD (Liquid Crystal Display) 22, an outer imaging section 23 (an outer imaging section (left) 23a and an outer imaging section (right) 23b), an inner imaging section 24, a 3D adjustment switch 25, and a 3D indicator 26 are provided. Hereinafter, theses components will be described in detail.

As shown in FIG. 1, the upper LCD 22 is accommodated in the upper housing 21. The number of pixels of the upper LCD 22 may be, for example, 800 dots×240 dots (the horizontal line×the vertical line). Although, in the present embodiment, the upper LCD 22 is an LCD, a display device using an EL (Electro Luminescence), or the like may be used. In addition, a display device having any resolution may be used as the upper LCD 22.

The upper LCD 22 is a display device capable of displaying a stereoscopically visible image. Further, in the present embodiment, an image for left eye and an image for right eye are displayed using substantially the same display area. Specifically, the upper LCD 22 may be a display device using a method in which the image for left eye and the image for right eye are alternately displayed in the horizontal direction in predetermined units (for example, every other line). Alternatively, a display device using a method in which the image for left eye and the image for right eye are alternately displayed in a time sharing manner may be used. Further, in the present embodiment, the upper LCD 22 is a display device capable of displaying an image which is stereoscopically visible with naked eyes. A lenticular lens type display device or a parallax barrier type display device is used which enables the image for left eye and the image for right eye, which are alternately displayed in the horizontal direction, to be separately viewed by the left eye and the right eye, respectively. In the present embodiment, the upper LCD 22 of a parallax barrier type is used. The upper LCD 22 displays, by using the image for right eye and the image for left eye, an image (a stereoscopically visible image) that is stereoscopically visible with naked eyes. That is, the upper LCD 22 allows a user to view the image for left eye with her/his left eye, and the image for right eye with her/his right eye by utilizing a parallax barrier, so that a stereoscopically visible image exerting a stereoscopic effect for a user can be displayed. Further, the upper LCD 22 may disable the parallax barrier. When the parallax barrier is disabled, an image can be displayed in a planar manner (it is possible to display a planar visible image which is different from a stereoscopically visible image as described above. Specifically, a display mode is used in which the same displayed image is viewed with a left eye and a right eye.). Thus, the upper LCD 22 is a display device capable of switching between a stereoscopic display mode for displaying a stereoscopically visible image and a planar display mode for displaying an image in a planar manner (display in a planar visible manner). The switching of the display mode is performed by the 3D adjustment switch 25 described later.

Two imaging sections (23a and 23b) provided on the outer side surface (the back surface reverse of the main surface on which the upper LCD 22 is provided) 21D of the upper housing 21 are generically referred to as the outer imaging section 23. In the present embodiment, the outer imaging section 23 is composed of two imaging sections, i.e., the outer imaging section (left) 23a and the outer imaging section (right) 23b. The imaging directions of the outer imaging section (left) 23a and the outer imaging section (right) 23b are each the same as the outward normal direction of the outer side surface 21D (the positive direction of the z-axis in FIG. 1). Specifically, the imaging direction of the outer imaging section (left) 23a and the imaging direction of the outer imaging section (right) 23b are parallel to each other. The outer imaging section (left) 23a and the outer imaging section (right) 23b can be used as a stereo camera depending on a program executed by the game apparatus 10. Further, depending on a program, when any one of the two outer imaging sections (23a and 23b) is used alone, the outer imaging section 23 may be used as a non-stereo camera. Further, depending on a program, images shot by the two outer imaging sections (23a and 23b) may be combined with each other or may compensate for each other, thereby enabling imaging using an extended imaging range. Each of the outer imaging section (left) 23a and the outer imaging section (right) 23b includes an imaging device, such as a CCD image sensor or a CMOS image sensor, having a common predetermined resolution, and a lens. The lens may have a zooming mechanism.

As indicated by dashed lines in FIG. 1 and by solid lines in part (b) of FIG. 2, the outer imaging section (left) 23a and the outer imaging section (right) 23b forming the outer imaging section 23 are aligned so as to be parallel to the horizontal direction of the screen of the upper LCD 22 (the x-axis direction in FIG. 1). Specifically, the outer imaging section (left)

23a and the outer imaging section (right) 23b are positioned such that a straight line connecting between the two imaging sections is parallel to the horizontal direction of the screen of the upper LCD 22. Reference numerals 23a and 23b which are indicated as dashed lines in FIG. 1 represent the outer imaging section (left) 23a and the outer imaging section (right) 23b, respectively, which are positioned on the outer side surface reverse of the inner side surface of the upper housing 21. As shown in FIG. 1, when a user views the screen of the upper LCD 22 from the front thereof, the outer imaging section (left) 23a is positioned to the left of the upper LCD 22 and the outer imaging section (right) 23b is positioned to the right of the upper LCD 22. When a program for causing the outer imaging section 23 to function as a stereo camera is executed, the outer imaging section (left) 23a shoots an image for a left eye, which is viewed by a left eye of a user, and the outer imaging section (right) 23b shoots an image for a right eye, which is viewed by a right eye of the user. A distance between the outer imaging section (left) 23a and the outer imaging section (right) 23b is set so as to be approximately the same as a distance between both eyes of a person, that is, may be set so as to be within a range from 30 mm to 70 mm, for example. However, the distance between the outer imaging section (left) 23a and the outer imaging section (right) 23b is not limited to a distance within the range described above.

In the present embodiment, the outer imaging section (left) 23a and the outer imaging section (right) 23b are secured to the housing, and the imaging directions thereof cannot be changed.

Further, the outer imaging section (left) 23a and the outer imaging section (right) 23b are provided at positions that are symmetrical with respect to the center of the upper LCD 22 (upper housing 21) in the horizontal direction (the x-axis direction in FIG. 1). Specifically, the outer imaging section (left) 23a and the outer imaging section (right) 23b are positioned so as to be symmetrical with respect to a line which divides the upper LCD 22 into two equal parts, that is, the left part and the right part. Further, the outer imaging section (left) 23a and the outer imaging section (right) 23b are positioned at positions which are reverse of positions above the upper edge of the screen of the upper LCD 22 and which are on the upper portion of the upper housing 21 in an opened state. Specifically, when the upper LCD 22 is projected on the outer side surface of the upper housing 21, the outer imaging section (left) 23a and the outer imaging section (right) 23b are positioned, on the outer side surface of the upper housing 21, at a position above the upper edge of the screen of the upper LCD 22 having been projected.

As described above, the two imaging sections (23a and 23b) of the outer imaging section 23 are positioned to the left and the right of the upper LCD 22 so as to be horizontally symmetrical with respect to the center of the upper LCD 22. Therefore, when a user views the upper LCD 22 from the front thereof, the imaging direction of the outer imaging section 23 can be the same as the direction of the line of sight of the user. Further, the outer imaging section 23 is positioned at a position reverse of a position above the upper edge of the screen of the upper LCD 22. Therefore, the outer imaging section 23 and the upper LCD 22 do not interfere with each other inside the upper housing 21. Therefore, the upper housing 21 may have a reduced thickness as compared to a case where the outer imaging section 23 is positioned on a position reverse of a position of the screen of the upper LCD 22.

The inner imaging section 24 is positioned on the inner side surface (main surface) 21B of the upper housing 21, and acts as an imaging section which has an imaging direction which is the same direction as the inward normal direction of the inner side surface (the negative direction of the z-axis in FIG. 1). The inner imaging section 24 includes an imaging device, such as a CCD image sensor and a CMOS image sensor, having a predetermined resolution, and a lens. The lens may have a zooming mechanism.

The 3D adjustment switch 25 is a slide switch, and is used for switching a display mode of the upper LCD 22 as described above. Further, the 3D adjustment switch 25 is used for adjusting the stereoscopic effect of a stereoscopically visible image which is displayed on the upper LCD 22. A slider 25a of the 3D adjustment switch 25 is slidable to any position in a predetermined direction (along the longitudinal direction of the right side surface), and a display mode of the upper LCD 22 is determined in accordance with the position of the slider 25a. In addition, a manner in which the stereoscopically visible image is visible is adjusted in accordance with the position of the slider 25a.

The 3D indicator 26 indicates whether or not the upper LCD 22 is in the stereoscopic display mode. The 3D indicator 26 is implemented as a LED, and is lit up when the stereoscopic display mode of the upper LCD 22 is enabled. The 3D indicator 26 may be lit up only when the program processing for displaying a stereoscopically visible image is performed in a state where the upper LCD 22 is in the stereoscopic display mode.

Further, a speaker hole 21E is provided on the inner side surface of the upper housing 21. A sound is outputted through the speaker hole 21E from a speaker 43 described later.

(Internal Configuration of Game Apparatus 10)

Figure 3:
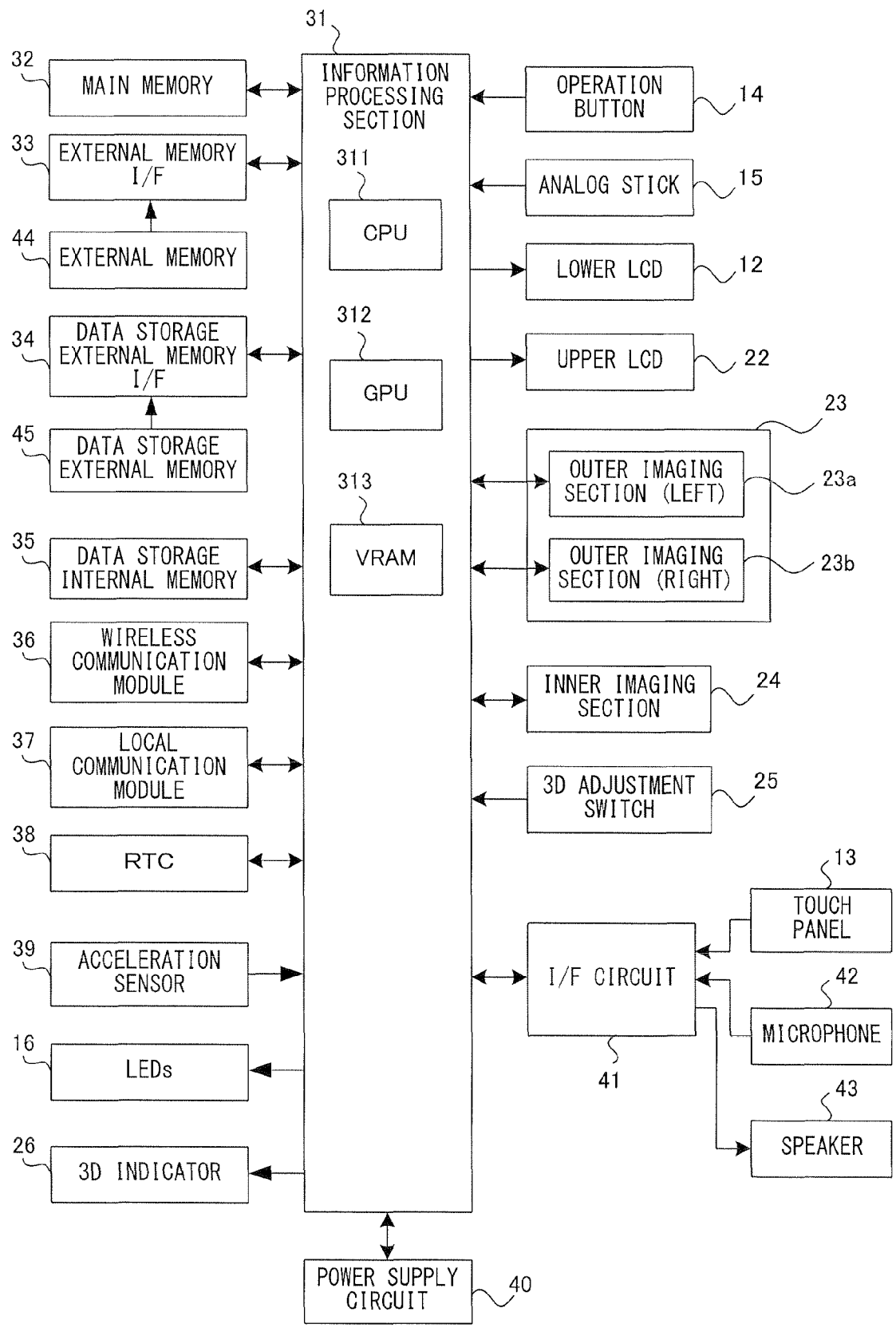
FIG. 3 is a block diagram showing a non-limiting example of the internal configuration of the game apparatus 10.

Next, an internal electrical configuration of the game apparatus 10 will be described with reference to FIG. 3. FIG. 3 is a block diagram illustrating an internal configuration of the game apparatus 10. As shown in FIG. 3, the game apparatus 10 includes, in addition to the components described above, electronic components such as an information processing section 31, a main memory 32, an external memory interface (external memory I/F) 33, an external data storage memory I/F 34, an internal data storage memory 35, a wireless communication module 36, a local communication module 37, a real-time clock (RTC) 38, an acceleration sensor 39, a power supply circuit 40, an interface circuit (I/F circuit) 41, and the like. These electronic components are mounted on an electronic circuit substrate, and accommodated in the lower housing 11 (or the upper housing 21).

The information processing section 31 is information processing means which includes a CPU (Central Processing Unit) 311 for executing a predetermined program, a GPU (Graphics Processing Unit) 312 for performing image processing, and the like. The CPU 311 of the information processing section 31 executes a program stored in a memory (for example, the external memory 44 connected to the external memory I/F 33 or the internal data storage memory 35) inside the game apparatus 10, thereby executing processing corresponding to the program. The program executed by the CPU 311 of the information processing section 31 may be acquired from another device through communication with the other device. The information processing section 31 further includes a VRAM (Video RAM) 313. The GPU 312 of the information processing section 31 generates an image in accordance with an instruction from the CPU 311 of the information processing section 31, and renders the image in the VRAM 313. The GPU 312 of the information processing section 31 outputs the image rendered in the VRAM 313, to the upper LCD 22 and/or the lower LCD 12, and the image is displayed on the upper LCD 22 and/or the lower LCD 12.

The main memory 32, the external memory I/F 33, the external data storage memory I/F 34, and the internal data storage memory 35 are connected to the information processing section 31. The external memory I/F 33 is an interface for detachably connecting to the external memory 44. The external data storage memory I/F 34 is an interface for detachably connecting to the external data storage memory 45.

The main memory 32 is volatile storage means used as a work area and a buffer area for (the CPU 311 of) the information processing section 31. That is, the main memory 32 temporarily stores various types of data used for the processing based on the above program, and temporarily stores a program acquired from the outside (the external memory 44, another device, or the like), for example. In the present embodiment, for example, a PSRAM (Pseudo-SRAM) is used as the main memory 32.

The external memory 44 is nonvolatile storage means for storing a program executed by the information processing section 31. The external memory 44 is implemented as, for example, a read-only semiconductor memory. When the external memory 44 is connected to the external memory I/F 33, the information processing section 31 can load a program stored in the external memory 44. A predetermined process is performed by the program loaded by the information processing section 31 being executed. The external data storage memory 45 is implemented as a non-volatile readable and writable memory (for example, a NAND flash memory), and is used for storing predetermined data. For example, images taken by the outer imaging section 23 and/or images taken by another device are stored in the external data storage memory 45. When the external data storage memory 45 is connected to the external data storage memory I/F 34, the information processing section 31 loads an image stored in the external data storage memory 45, and the image can be displayed on the upper LCD 22 and/or the lower LCD 12.

The internal data storage memory 35 is implemented as a non-volatile readable and writable memory (for example, a NAND flash memory), and is used for storing predetermined data or a predetermined program. For example, in the internal data storage memory 35, a default parameter or a display adjustment parameter, which are described later, for adjusting the display positions of an image for left eye and an image for right eye when the outer imaging section 23 functions as a stereo camera, is stored. These parameters will be described later.

The wireless communication module 36 has a function of connecting to a wireless LAN by using a method based on, for example, IEEE 802.11.b/g standard. The local communication module 37 has a function of performing wireless communication with the same type of game apparatus in a predetermined communication method (for example, communication based on a unique protocol, or infrared communication). The wireless communication module 36 and the local communication module 37 are connected to the information processing section 31. The information processing section 31 can perform data transmission to and data reception from another device via the Internet by using the wireless communication module 36, and can perform data transmission to and data reception from the same type of another game apparatus by using the local communication module 37.

The acceleration sensor 39 is connected to the information processing section 31. The acceleration sensor 39 detects magnitudes of accelerations (linear accelerations) in the directions of the straight lines along the three axial directions (x-axis, y-axis, and z-axis), respectively. The acceleration sensor 39 is provided inside the lower housing 11. As shown in FIG. 1, the acceleration sensor 39 detects the magnitudes of linear accelerations in the directions of the x-axis, the y-axis, and the z-axis, where the x-axis direction is the long-side direction of the lower housing 11, the y-axis direction is the short-side direction of the lower housing 11, and the z-axis direction is the direction perpendicular to the inner side surface (main surface) of the lower housing 11. The acceleration sensor 39 is, for example, an electrostatic capacitance type acceleration sensor. However, another type of acceleration sensor may be used. The acceleration sensor 39 may be an acceleration sensor for detecting a magnitude of an acceleration for one axial direction or two-axial directions. The information processing section 31 can receive data (acceleration data) representing accelerations detected by the acceleration sensor 39, and detect the orientation and the motion of the game apparatus 10. It is noted that, in addition to (or instead of) the above acceleration sensor 39, another sensor such as an angle sensor or an angular velocity sensor may be connected to the information processing apparatus 31, whereby the other sensor may detect the orientation or the motion of the game apparatus 10.

The RTC 38 and the power supply circuit 40 are connected to the information processing section 31. The RTC 38 counts time, and outputs the time to the information processing section 31. The information processing section 31 calculates a current time (date) based on the time counted by the RTC 38. The power supply circuit 40 controls power from the power supply (the rechargeable battery accommodated in the lower housing 11 as described above) of the game apparatus 10, and supplies power to each component of the game apparatus 10.

In addition, the LEDs 16 (16A and 16B) are connected to the information processing apparatus 31. By the LEDs 16, the information processing apparatus 31 notifies a user of the ON/OFF status of the power supply of the game apparatus 10, or of the establishment status of wireless communication of the game apparatus 10.

The I/F circuit 41 is connected to the information processing section 31. The microphone 42 and the speaker 43 are connected to the OF circuit 41. Specifically, the speaker 43 is connected to the I/F circuit 41 through an amplifier which is not shown. The microphone 42 detects a voice from a user, and outputs a sound signal to the I/F circuit 41. The amplifier amplifies a sound signal outputted from the I/F circuit 41, and a sound is outputted from the speaker 43. The touch panel 13 is connected to the I/F circuit 41. The I/F circuit 41 includes a sound control circuit for controlling the microphone 42 and the speaker 43 (amplifier), and a touch panel control circuit for controlling the touch panel. The sound control circuit performs A/D conversion and D/A conversion on the sound signal, and converts the sound signal to a predetermined form of sound data, for example. The touch panel control circuit generates a predetermined form of touch position data based on a signal outputted from the touch panel 13, and outputs the touch position data to the information processing section 31. The touch position data represents a coordinate of a position, on an input surface of the touch panel 13, on which an input is made. The touch panel control circuit reads a signal outputted from the touch panel 13, and generates the touch position data every predetermined time. The information processing section 31 acquires the touch position data, to recognize a position on which an input is made on the touch panel 13.

The operation button 14 includes the operation buttons 14A to 14L described above, and is connected to the information processing section 31. Operation data representing an input state of each of the operation buttons 14A to 14I is outputted from the operation button 14 to the information processing section 31, and the input state indicates whether or not each of the operation buttons 14A to 14I has been pressed. The information processing section 31 acquires the operation data from the operation button 14 to perform processing in accordance with the input on the operation button 14.

The analog stick 15 is connected to the information processing apparatus 31. Operation data indicating an analog input (operation direction and operation amount) to the analog stick 15 is outputted from the analog stick 15 to the information processing apparatus 31. The information processing apparatus 31 acquires the operation data from the analog stick 15, thereby executing processing in accordance with the input to the analog stick 15.

The lower LCD 12 and the upper LCD 22 are connected to the information processing section 31. The lower LCD 12 and the upper LCD 22 each display an image in accordance with an instruction from (the GPU 312 of) the information processing section 31. In the present embodiment, the information processing section 31 causes the upper LCD 22 to display a stereoscopically visible image.

Specifically, the information processing section 31 is connected to an LCD controller (not shown) of the upper LCD 22, and causes the LCD controller to set the parallax barrier to ON or OFF (enabled state or disabled state). When the parallax barrier is set to ON in the upper LCD 22, an image for right eye and an image for left eye which are stored in the VRAM 313 of the information processing section 31 are outputted to the upper LCD 22. More specifically, the LCD controller alternately repeats reading of pixel data of the image for right eye for one line in the vertical direction, and reading of pixel data of the image for left eye for one line in the vertical direction, thereby reading, from the VRAM 313, the image for right eye and the image for left eye. Thus, an image to be displayed is divided into the images for a right eye and the images for a left eye each of which is a rectangle-shaped image having one line of pixels aligned in the vertical direction, and an image, in which the rectangle-shaped image for the left eye which is obtained through the division, and the rectangle-shaped image for the right eye which is obtained through the division are alternately aligned, is displayed on the screen of the upper LCD 22. A user views the images through the parallax barrier in the upper LCD 22, so that the image for the right eye is viewed by the user's right eye, and the image for the left eye is viewed by the user's left eye. Thus, the stereoscopically visible image is displayed on the screen of the upper LCD 22.

The outer imaging section 23 and the inner imaging section 24 are connected to the information processing section 31. The outer imaging section 23 and the inner imaging section 24 each take an image in accordance with an instruction from the information processing section 31, and output data of the taken image to the information processing section 31.

The 3D adjustment switch 25 is connected to the information processing section 31. The 3D adjustment switch 25 transmits, to the information processing section 31, an electrical signal in accordance with the position of the slider 25a.

The 3D indicator 26 is connected to the information processing section 31. The information processing section 31 controls whether or not the 3D indicator 26 is to be lit up. For example, the information processing section 31 lights up the 3D indicator 26 when the upper LCD 22 is in the stereoscopic display mode. Description thus far is for the internal configuration of the game apparatus 10.

(Taking Adjustment Image with Stereo Camera)

Figure 4:
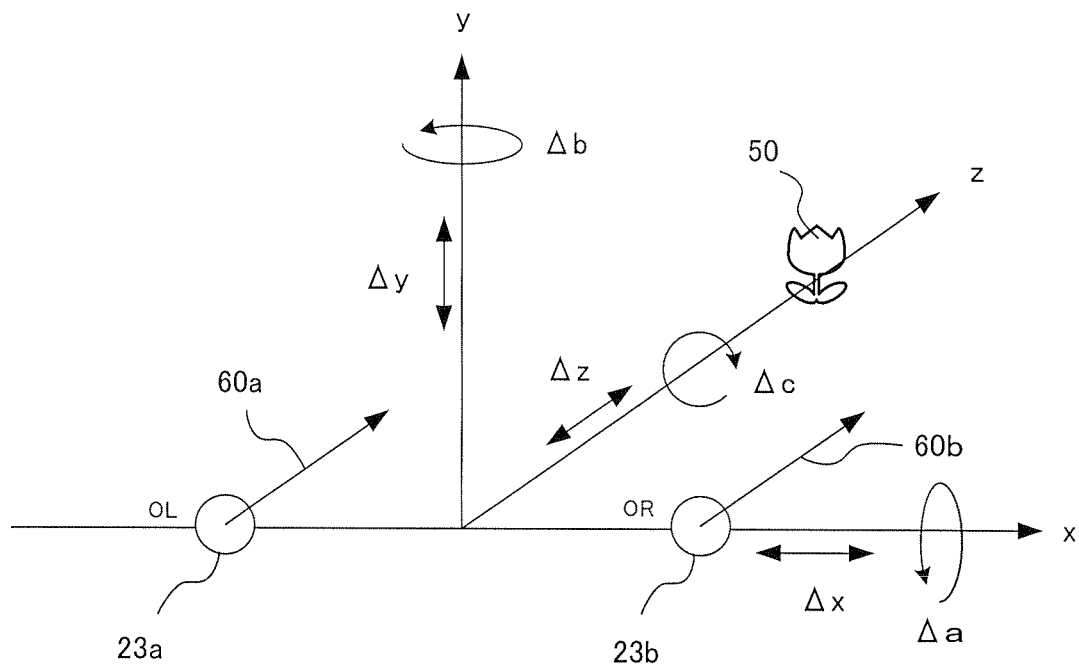
FIG. 4 shows a non-limiting example of a stereo camera taking an image of a subject 50.
Figure 5:
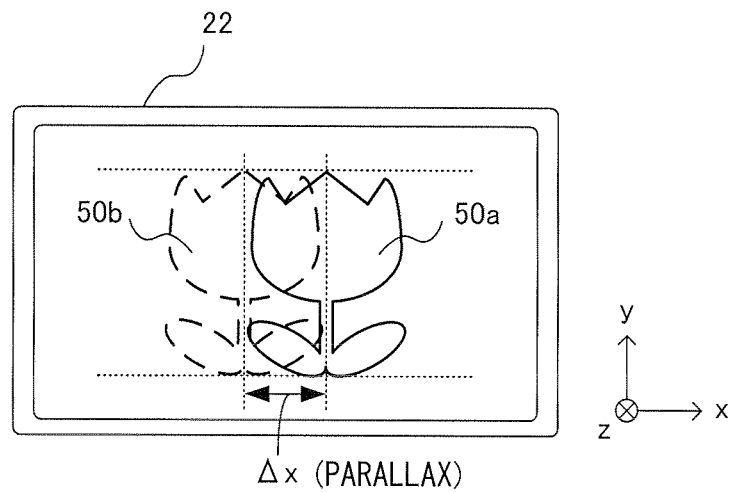
FIG. 5 shows a non-limiting example of display of adjustment images.

Next, with reference to FIG. 4 and FIG. 5, how to take an adjustment image by the outer imaging section 23 which functions as the stereo camera will be described. Here, the adjustment image includes an image of a given subject (for example, a subject 50), and the display position of the image of the given subject is adjusted by an adjustment mechanism described later. Hereinafter, the outer imaging section (left) 23a may be referred to as a left stereo camera 23a, and the outer imaging section (right) 23b may be referred to as a right stereo camera 23b. FIG. 4 shows the manner of taking an image of the subject 50 with the left stereo camera 23a and the right stereo camera 23b. FIG. 5 shows the adjustment images taken with the left stereo camera 23a and the right stereo camera 23b (a left adjustment image 50a and a right adjustment image 50b each including an image of the subject 50) and displayed on the display surface of the upper LCD 22 in a superimposed manner.

As shown in FIG. 4, the left stereo camera 23a, the right stereo camera 23b, and the subject 50 are placed in the same 3-dimensional space as the 3-dimensional orthogonal coordinate space (xyz coordinate space) shown in FIG. 1. More specifically, the left stereo camera 23a and the right stereo camera 23b are placed on the x-axis such that the middle point of the line segment connecting the centers of these cameras is at the origin. In addition, the z-axis is set in the direction parallel to imaging directions 60a and 60b (optical axis directions) of the left stereo camera 23a and the right stereo camera 23b, and the y-axis is set in the upward direction perpendicular to the x-axis and the z-axis. The subject 50 is placed on the z-axis which is parallel to the imaging directions of the left stereo camera 23a and the right stereo camera 23b. The left stereo camera 23a takes an image of the subject 50, to generate the left adjustment image 50a, and the right stereo camera 23b takes an image of the subject 50, to generate the right adjustment image 50b. Here, when the left adjustment image 50a and the right adjustment image 50b respectively including the images of the subject 50 are displayed at the same time on a predetermined display surface (the display screen of the upper LCD 22) placed on the xy plane, the display positions of the subject 50 on both adjustment images are displaced from each other by a predetermined distance in the x-axis direction (see FIG. 5). This displacement corresponds to parallax. If the parallax barrier is turned on, the left adjustment image 50a is displayed to (recognized by) the left eye of a user, and the right adjustment image 50b is displayed to (recognized by) the right eye of the user, whereby the subject 50 is recognized as a stereoscopically visible image providing a stereoscopic effect (that is, an image protruding forward or retracted backward).

Figure 6:
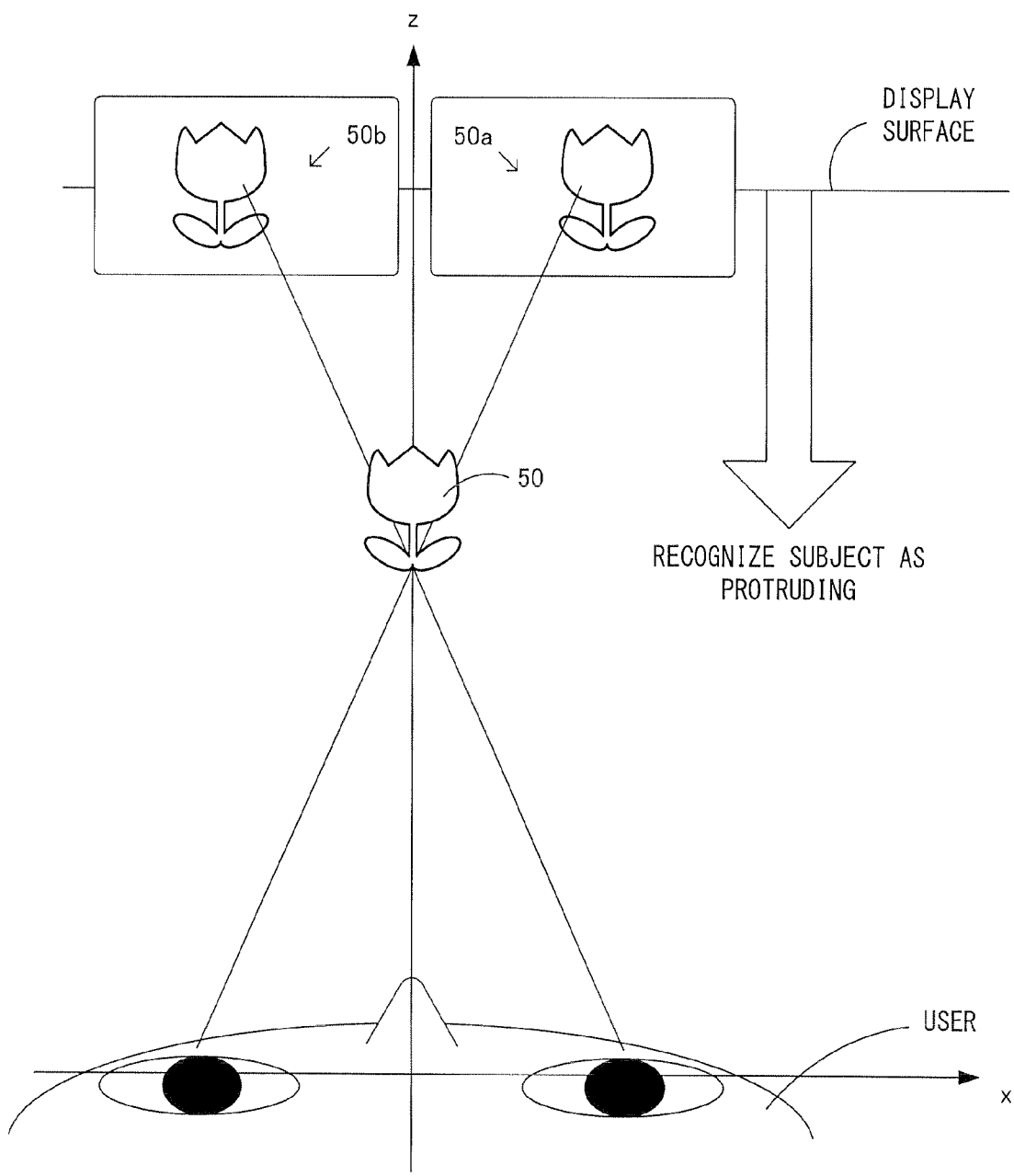
FIG. 6 shows a non-limiting example of stereoscopic viewing.

More specifically, as shown in FIG. 5, regarding the adjustment images displayed on the upper LCD 22, the left adjustment image 50a (the display position of the subject 50 on this image) is relatively displaced rightward (in the positive direction of the x-axis) from the right adjustment image 50b (the display position of the subject 50 on this image). In this case, if a user views these images by cross view, the subject 50 appears to protrude forward from the predetermined display surface (see FIG. 6). It is noted that in the case where the left adjustment image 50a (the display position of the subject 50 on this image) is relatively displaced leftward (in the negative direction of the x-axis) from the right adjustment image 50b (the display position of the subject 50 on this image), if a user views these images by parallel view, the subject 50 appears to be retracted backward from the predetermined display surface (this case is not shown). In addition, in the case where the left adjustment image 50a and the right adjustment image 50b (the display positions of the subject 50 on these images) are equal to each other, a user recognizes the subject 50 as being positioned on the predetermined display surface (this case is not shown). Thus, if the right eye and the left eye separated by a predetermined distance in the x-axis direction (the horizontal direction) (see FIG. 6) respectively recognize the right adjustment image 50b and the left adjustment image 50a which are also displaced from each other by a predetermined parallax distance in the x-axis direction (the horizontal direction), a user can synthesize those images by the brain to recognize them as a stereoscopically visible image. That is, the displacement (e.g., parallax) between the two images with respect to the x-axis direction is significant for generation of a stereoscopically visible image. It is noted that the parallax varies among individual persons. Therefore, the parallax (stereoscopic effect) can be adjusted by the 3D adjustment switch 25. On the other hand, in the case where the two images displaced from each other in the y-axis direction (vertical direction) are displayed on the predetermined display surface (the display screen of the upper LCD 22) and viewed by the respective eyes of a user, it is difficult for a user to appropriately synthesize the images into a stereoscopically visible image by the brain, and the user might recognize the images as two images displaced from each other. It is considered that this is because the viewing directions of the right eye and the left eye of a human is the same with respect to the vertical direction. That is, the displacement of the two images in the y-axis direction can become a problem for displaying a stereoscopically visible image. Hereinafter, the cause of such displacement between the two images in the y-axis direction (vertical direction) will be described.

In general, it is desirable that the optical positions such as the attachment positions and the optical axes of the left stereo camera 23a and the right stereo camera 23b are accurately aligned. However, even though such optical positions may be fallen within a predetermined error range at the point of distribution of apparatuses, the optical positions can be displaced beyond the predetermined error range owing to outer shock when used, aging, or the like. Examples of the displacement include translational displacements Δx, Δy, and Δz parallel to the x-axis, the y-axis, and the z-axis, respectively, rotational displacements Δa, Δb, and Δc around the x-axis direction, the y-axis direction, and the z-axis direction, respectively, and displacement due to the angle of view of a lens (see FIG. 4).

Here, for example, it will be assumed that the right stereo camera 23b (the optical position thereof) is displaced relative to the left stereo camera 23a as a reference. The displacement between two images displayed on the display surface in that case will be described. If translational displacement of the right stereo camera 23b by Δx in the x-axis direction occurs or if rotational displacement of the right stereo camera 23b by Δb around the y-axis direction occurs, displacement in the x-axis direction occurs on the right adjustment image 50b. If translational displacement of the right stereo camera 23b by Δy in the y-axis direction occurs or if rotational displacement of the right stereo camera 23b by Δa around the x-axis direction occurs, displacement in the y-axis direction occurs on the right adjustment image 50b. If translational displacement of the right stereo camera 23b by Δz in the z-axis direction occurs, or if the angle of view changes because of change in the focal distance of the lens, the size of the right adjustment image 50b when displayed on the display surface changes (enlarges or contracts). If rotational displacement of the right stereo camera 23b by Δc around the z-axis direction occurs, rotational displacement occurs on the right adjustment image 50b displayed on the display surface.

As described above, in recognition of a stereoscopically visible image, if displacement in the y-axis direction (in the vertical direction as seen from a user) occurs between two images, when a user synthesizes the two images by the brain in order to recognize them as a stereoscopically visible image, there is a possibility that the user recognizes them as merely two images displaced from each other, so that it may be difficult to obtain a stereoscopic view. Therefore, in the case where the optical positions of the left stereo camera 23a and the right stereo camera 23b are displaced relative to each other, it is preferable to perform adjustment (correction) for removing displacement in the y-axis direction. However, in conventional techniques for correcting not only displacement in the y-axis direction but also other displacements, adjustment pattern images and the like for correction are to be prepared. Therefore, even though the manufacturer may be able to perform the adjustment, it is difficult for a user to perform the adjustment. Hereinafter, a characteristic adjustment mechanism of the present embodiment which allows a user to perform the adjustment will be described.

(Characteristic Adjustment Mechanism of Present Embodiment)

Figure 7:
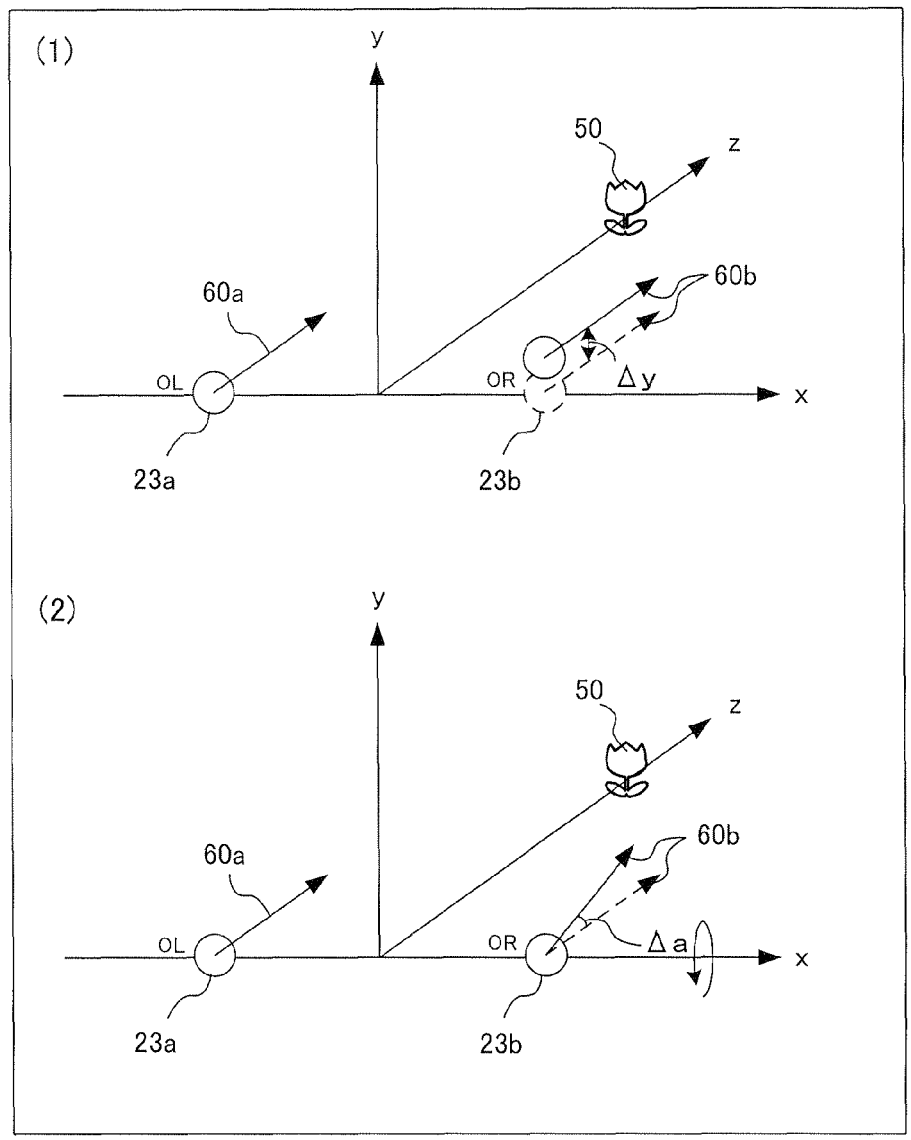
FIG. 7 shows a non-limiting example of displacement of the optical position of the stereo camera.

FIG. 7 shows the case where the right stereo camera 23b (the optical position thereof) is displaced relative to the left stereo camera 23a (the optical position thereof). Part (1) of FIG. 7 shows translational displacement of the right stereo camera 23b by Δy in the positive direction of the y-axis. Part (2) of FIG. 7 shows rotational displacement of the right stereo camera 23b by Δa in the clockwise direction based on the positive direction of the x-axis.

Figure 8:
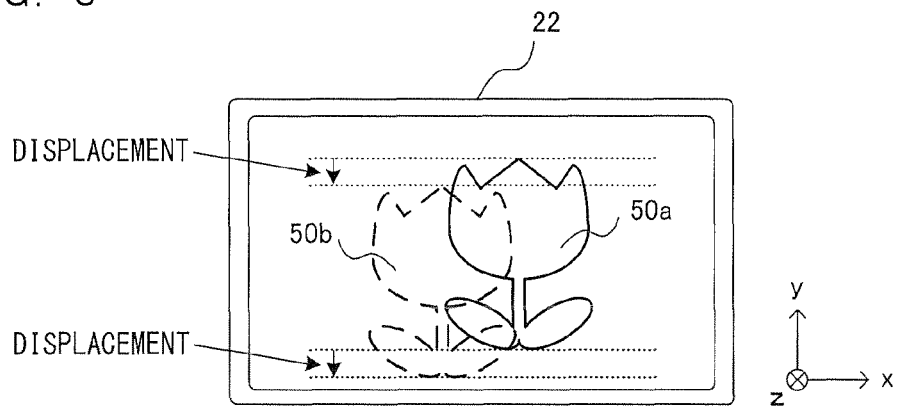
FIG. 8 shows a non-limiting example of displacement between the display positions of the adjustment images.

As shown in part (1) of FIG. 7, in the case where translational displacement of the right stereo camera 23b by Δy in the positive direction of the y-axis occurs relative to the left stereo camera 23a, the right adjustment image 50b generated by the right stereo camera 23b is displayed being displaced from the left adjustment image 50a by a predetermined distance in the negative direction of the y-axis (in the downward direction) (see FIG. 8). It is noted that the predetermined distance is a value determined in accordance with the z-coordinate of the subject 50 (that is, the depth distance from the stereo camera to the subject 50) and the magnitude of Δy. Similarly, as shown in part (2) of FIG. 7, in the case where the rotational displacement of the right stereo camera 23b by Δa in the clockwise direction based on the positive direction of the x-axis occurs relative to the left stereo camera 23a, the right adjustment image 50b generated by the right stereo camera 23b is displayed being displaced from the left adjustment image 50a by a predetermined distance in the negative direction of the y-axis (in the downward direction) (see FIG. 8). It is noted that the predetermined distance is a value determined in accordance with the magnitude of the rotation angle Δa.

In the case where the right adjustment image 50b is displaced from the left adjustment image 50a in the negative direction of the y-axis (in the downward direction) as described above, if a user views the left adjustment image 50a with the left eye and the right adjustment image 50b with the right eye when the parallax barrier is ON to see a stereoscopically visible image, the user recognizes them as two images displaced from each other. Therefore, it is preferable to perform adjustment for removing the displacement, between the display positions of the two images, that has occurred after purchase. In the present embodiment, a user can perform such adjustment. Specifically, if a user takes an image of any subject (subject 50) with the stereo camera, one (here, the right adjustment image 50b) of the left adjustment image 50a and the right adjustment image 50b is displayed in a translucent manner. If the parallax barrier is turned off, the left adjustment image 50a and the right adjustment image 50b are displayed as still images on the display surface in a planar visible manner. That is, a user can view the right adjustment image 50b and the left adjustment image 50a as still images with both eyes at the same time, and can perform adjustment for removing the displacement between the display positions by moving the two still images upward, downward, rightward, or leftward as described later. It is noted that, although in the present embodiment, such still images displayed in a planar visible manner are used so as to facilitate the adjustment by a user, the exemplary embodiments are applicable also to a moving image (so-called preview image). Normally, since the left adjustment image 50a and the right adjustment image 50b have parallax therebetween, these images displayed in a planar visible manner are recognized as being displaced from each other in the x-axis direction (horizontal direction). Since such displacement in the horizontal direction is for causing parallax (a stereoscopic effect), the displacement influences the stereoscopic effect in stereoscopic viewing, but does not greatly influence a user's stereoscopic viewing as long as the displacement is small. In addition, such displacement in the horizontal direction can be adjusted by the 3D adjustment switch 25 for adjusting parallax. On the other hand, if displacement in the y-axis direction (vertical direction) occurs, the height of viewing seems to differ between a right eye and a left eye, and therefore, the stereoscopic viewing is influenced. Therefore, it is preferable for a user to perform adjustment for removing displacement between images that are displaced in the y-axis direction (vertical direction).

A user moves the right adjustment image 50b so as to align, with respect to the y-axis direction (vertical direction), the display position of the subject 50 on the right adjustment image 50b displayed in a translucent manner, with the display position of the subject 50 on the left adjustment image 50a, thereby removing the displacement in the y-axis direction. This adjustment is performed by actually viewing the displacement in the y-axis direction between the two images. Thus, a user can easily perform the adjustment through intuitive and easy operations. Specifically, if the mode has become a display adjustment mode for performing adjustment for removing displacement between images, a display screen for display adjustment is displayed on the lower LCD 12. On the display screen, a user can move the right adjustment image 50b displayed in a translucent manner in the vertical direction (y-axis direction) by touching an up-down button 70 displayed on the lower LCD 12 with the touch pen 28 (see FIG. 9). The user operates the touch pen 28 while viewing the two images displayed on the upper LCD 22, thereby performing adjustment for removing displacement in the y-axis direction between the left adjustment image 50a and the right adjustment image 50b. Then, the adjustment result (the displacement of the right adjustment image 50b between before and after the adjustment) is stored in the main memory 32. Thereafter, when a stereo image (composed of two images) taken with the right and left stereo cameras is displayed in a stereoscopically visible manner, the display position of the stereo image (displacement between the two images) is corrected based on the adjustment result. Thus, appropriate stereoscopically visible display can be realized which prevents a user from recognizing the two images as being displaced from each other.

Figure 10:
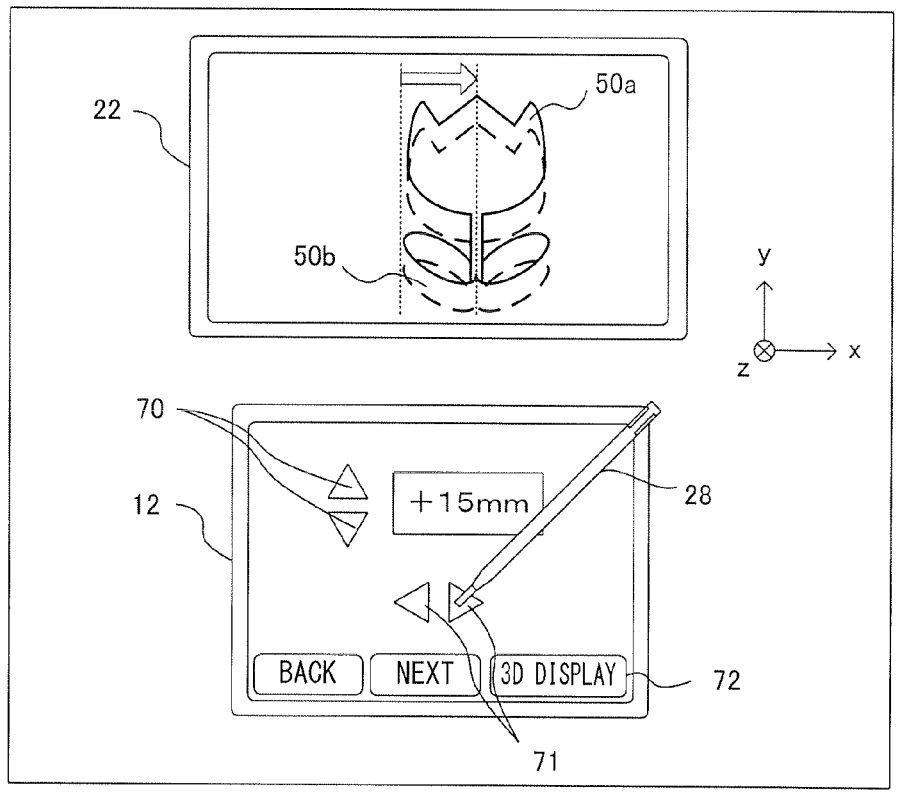
FIG. 10 shows a non-limiting example of movement of the display position of the adjustment image.

As previously described, in the first place, since the left adjustment image 50a and the right adjustment image 50b has parallax therebetween for providing a stereoscopic view, displacement in the x-axis direction has occurred between these images. Therefore, when a user performs adjustment for removing displacement in the y-axis direction between both images, it is impossible to cause the display positions of the subject 50 on both images to perfectly coincide with each other. Therefore, depending images (subject), it may be difficult to perform accurate adjustment for removing the displacement in the y-axis direction. In such a case, the right adjustment image 50b displayed in a translucent manner may be movable in the x-axis direction (horizontal direction). That is, as shown in FIG. 10, a user can move the right adjustment image 50b displayed in a translucent manner, also in the horizontal direction (x-axis direction) by touching a right-left button 71 displayed on the lower LCD 12. Thus, if the right adjustment image 50b can be moved in both the x-axis direction and the y-axis direction, a user can cause the display positions of an imaging target (subject 50) on the right adjustment image 50b and the left adjustment image 50a to substantially coincide with each other. As a result, a user can perform accurate adjustment for removing the displacement in the y-axis direction between the right adjustment image 50b and the left adjustment image 50a. In addition, no matter what the subject 50 is, it is possible to perform adjustment for removing displacement in the y-axis direction between both images. Therefore, a user can take an image of any subject as an adjustment image. It is noted that even in such a case, correction of the display positions of both images is performed based on the adjustment information about the y-axis direction of the adjustment result (i.e., based on the displacement in the y-axis direction of the right adjustment image 50b between before and after the adjustment).

(Details of Information Processing)

Next, information processing performed for executing a process of taking images with the stereo camera (hereinafter, referred to as a stereo camera imaging process) and a process of adjusting the display position of the stereo image (displacement between two images) by the adjustment mechanism mentioned above (hereinafter, referred to as a display adjustment process), will be described in detail. First, data to be stored in the main memory 32 in the stereo camera imaging process and the display adjustment process will be described.

(Memory Map)

Figure 11:
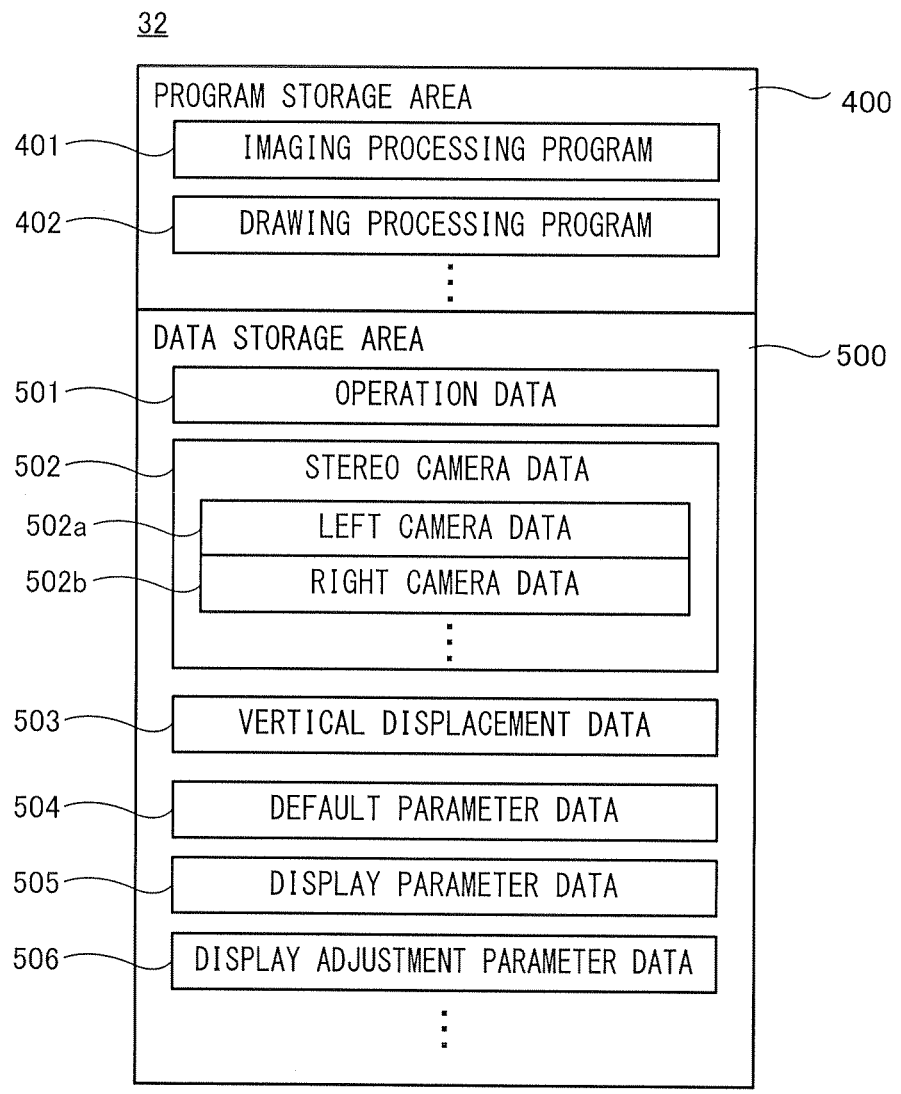
FIG. 11 shows a non-limiting example of the memory map of a main memory 32 of the game apparatus 10.

FIG. 11 shows an example of the memory map of the main memory 32 of the game apparatus 10. As shown in FIG. 11, the main memory 32 includes a program storage area 400 and a data storage area 500. A part of data for the program storage area 400 and the data storage area 500 has been stored in the external memory 44, for example, and is to be loaded and stored in the main memory 32 when the stereo camera imaging process or the display adjustment process is executed.

In the program storage area 400, programs such as an imaging processing program 401 and a drawing processing program 402 for executing a process of a flowchart shown in FIG. 12 described later are stored.

In the data storage area 500, operation data 501, stereo camera data 502, vertical displacement data 503, default parameter data 504, display parameter data 505, display adjustment parameter data 506, and the like are stored.

The operation data 501 indicates operations performed by a user for the operation buttons 14A to 14E and 14G to 14H, the analog stick 15, the 3D adjustment switch 25, and the touch panel 13. The operation data 501 includes data indicating an user's operation of moving an image for right eye displayed in a translucent manner, data indicating the position of the slider 25a of the 3D adjustment switch 25, and the like.

The stereo camera data 502 includes data of each camera composing the stereo camera described with reference to FIG. 4, i.e., the left stereo camera data 502a, the right stereo camera data 502b, and the like.

The left stereo camera data 502a is data of the left stereo camera 23a for taking an image for left eye which is viewed by the left eye of a user, and indicates the position, the imaging direction, and the imaging angle of view of the left stereo camera 23a based on the upper housing 21; a taken image by the left stereo camera 23a; and the like. It is noted that data of an image taken by the left stereo camera 23a is repeatedly updated every frame (for example, every 1/60 second).

The right stereo camera data 502b is data of the right stereo camera 23b for taking an image for right eye which is viewed by the right eye of a user, and indicates the position, the imaging direction, and the imaging angle of view of the right stereo camera 23b based on the upper housing 21; a taken image by the right stereo camera 23b; and the like. It is noted that data of an image taken by the right stereo camera 23b is repeatedly updated every frame (for example, every 1/60 second).

The vertical displacement data 503 indicates displacement in the vertical direction (y-axis direction) of the right adjustment image 50b displaced based on the operation data 501 indicating a user's operation of moving the right adjustment image 50b displayed in a translucent manner for adjustment.

The default parameter data 504 indicates a default parameter for setting the default display position of a stereo image (two images) taken with two cameras of the stereo camera. The default parameter is determined in accordance with the optical position of the stereo camera at the point of shipping, and the display position of the stereo image that corresponds to the apparatus state at the point of shipping is determined in accordance with the default parameter. It is noted that the default parameter is calculated at a factory by using a known pattern image and the like for adjustment, for example. The default parameter is stored in the data storage internal memory 35. Then, when the game apparatus 10 has been powered on, data in the data storage internal memory 35 is loaded into the main memory 32, so that the default parameter stored in the data storage internal memory 35 is stored as the default parameter data 504.

The display parameter data 505 indicates a parameter for determining the display position of a stereo image. When the game apparatus 10 has been powered on, data in the data storage internal memory 35 is loaded into the main memory 32. At this time, if a display adjustment parameter described later has been stored in the data storage internal memory 35, the display adjustment parameter is stored as the display parameter data 505. On the other hand, if the display adjustment parameter has not been stored in the data storage internal memory 35, the default parameter stored in the data storage internal memory 35 is stored as the display parameter data 505.

The display adjustment parameter data 506 indicates the display adjustment parameter for adjusting the display position of a stereo image taken by two cameras of the stereo camera. The display adjustment parameter is calculated based on the vertical displacement data 503. It is noted that when a user adjusts the display position of a stereo image (that is, the display adjustment parameter is calculated and registered), the display adjustment parameter is stored also in the data storage internal memory 35. As a result, when the game apparatus 10 has been powered on, data in the data storage internal memory 35 is loaded into the main memory 32, so that the display adjustment parameter stored in the data storage internal memory 35 is stored as the display parameter data 505.

(Stereo Camera Imaging Process)

Next, the stereo camera imaging process executed by the game apparatus 10 will be briefly described. When the game apparatus 10 has been powered on, the CPU 311 of the game apparatus 10 executes a boot program stored in the data storage internal memory 35 or the like, thereby initializing each unit such as the main memory 32. Then, the imaging processing program 401 stored in the external memory 44, data stored in the data storage internal memory 35, and the like are loaded into the main memory 32, and the CPU 311 executes the imaging processing program 401.

Processes executed by the game apparatus 10 includes the stereo camera imaging process (in a stereo camera imaging mode) and the display adjustment process (in a display adjustment mode). If the stereo camera imaging mode is selected, first, the GPU 312 acquires a display parameter by referring to the display parameter data 505, based on an instruction from the CPU 311. Next, the GPU 312 acquires an image for left eye taken by the left stereo camera 23a and an image for right eye taken by the right stereo camera 23b, by referring to the stereo camera data 502. Then, the GPU 312 displays the acquired stereo image (the image for left eye and the image for right eye) on the display screen of the upper LCD 22 in which the parallax barrier is ON, in a stereoscopically visible manner, based on the acquired display parameter. It is noted that the degree of stereoscopic effect in stereoscopic viewing can be adjusted by the 3D adjustment switch 25. Then, when the shutter button (the L-button 14G and the R-button 14H) has been pressed, the CPU 311 stores the stereo image displayed in a stereoscopically visible manner, in the data storage internal memory 35 or the data storage external memory 45.

On the other hand, if the display adjustment mode is selected, the CPU 311, or the GPU 312 based on an instruction from the CPU 311 performs processing of changing the display parameter. As described above, in the stereo camera imaging process, a stereo image is displayed on the display screen of the upper LCD 22, based on the display parameter. That is, the display positions of an image for left eye and an image for right eye are determined by the display parameter. Therefore, the display position of a stereo image displaced owing to displacement of the optical positions of the stereo camera are corrected by the display parameter being corrected (changed). Hereinafter, the display adjustment process executed in the display adjustment mode will be described in detail with reference to FIG. 12 and FIG. 13.

(Display Adjustment Process)

Figure 12:
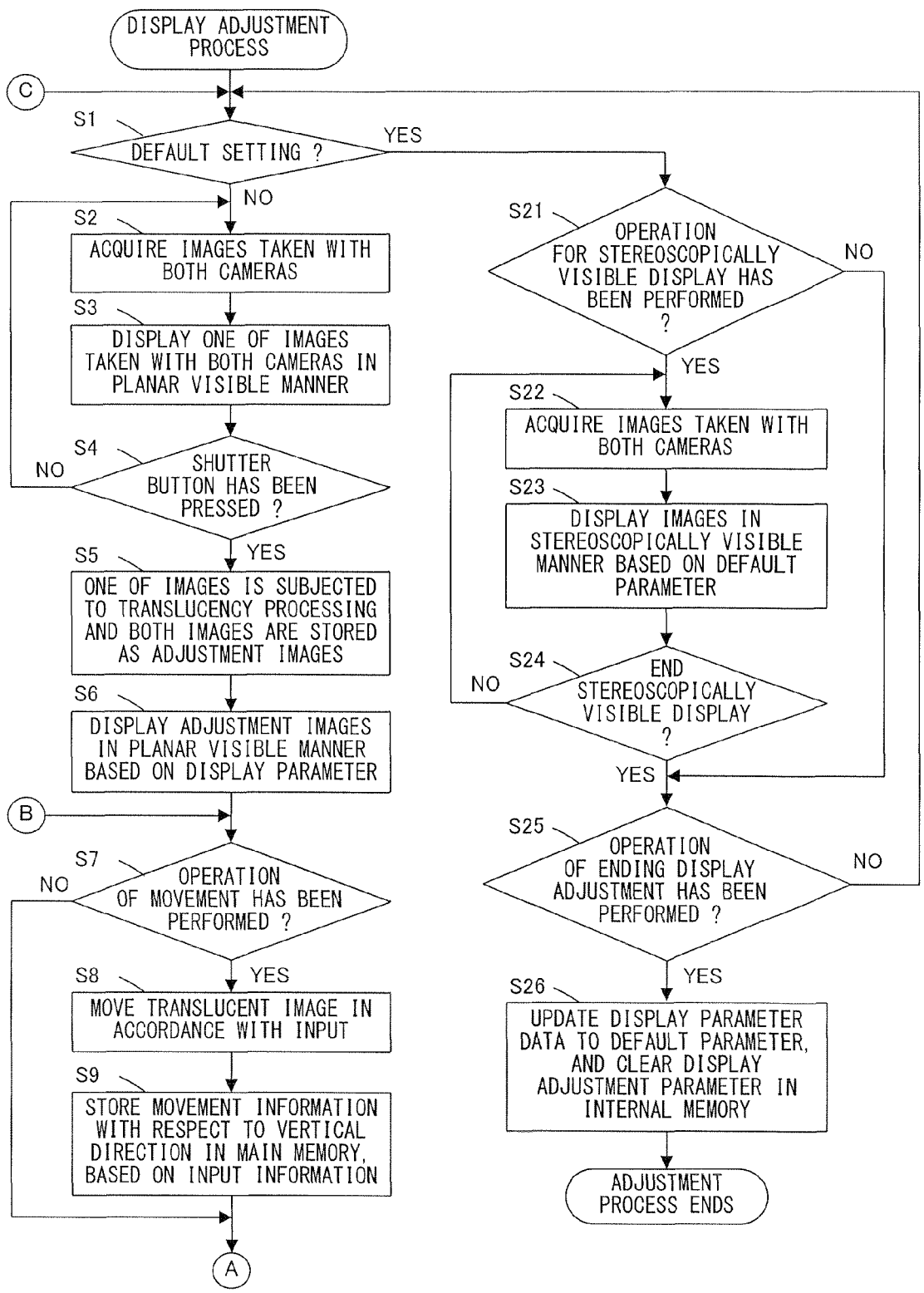
FIG. 12 shows a non-limiting example of a flowchart of a display adjustment process.
Figure 13:
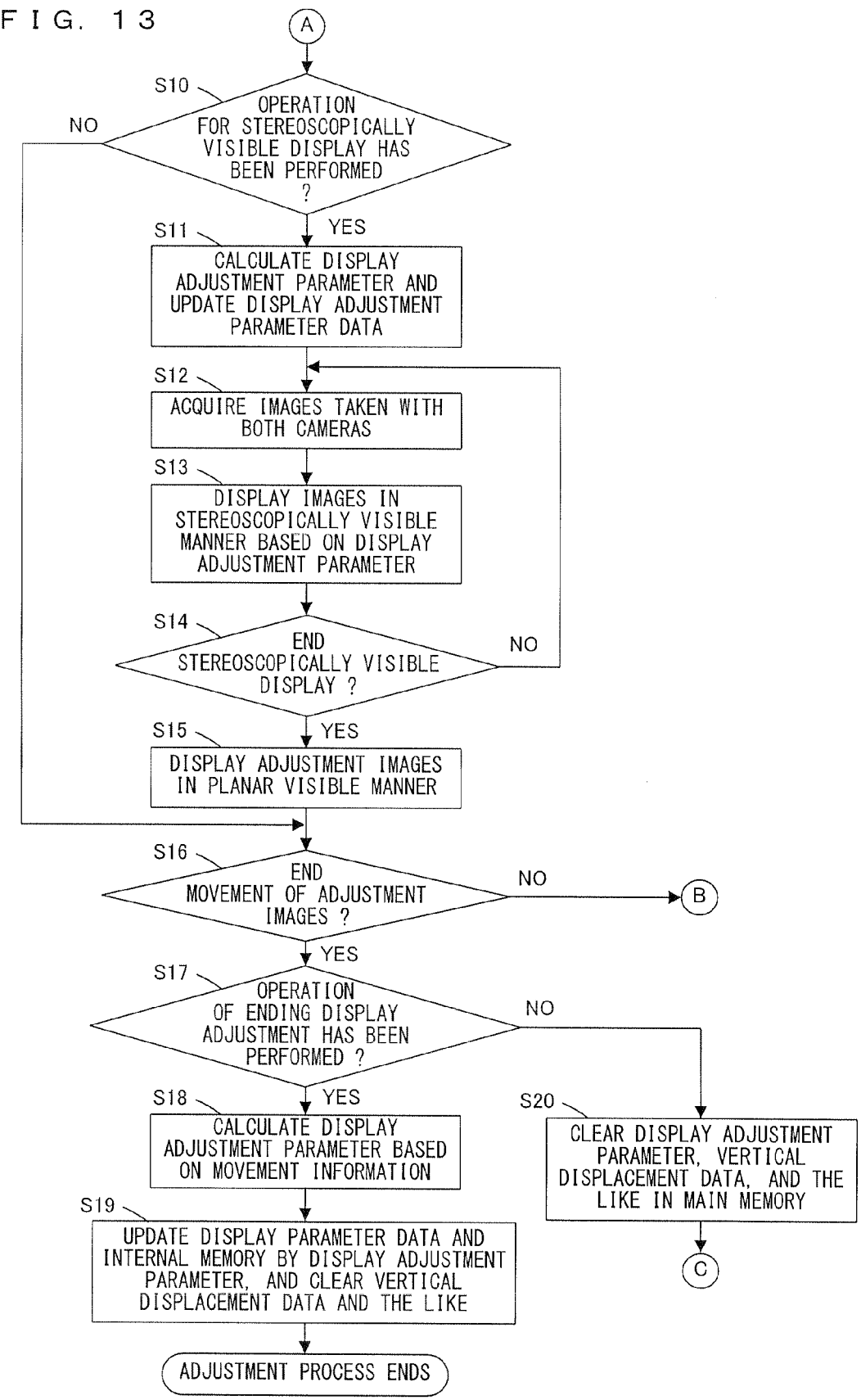
FIG. 13 shows a non-limiting example of a flowchart of the display adjustment process.

FIG. 12 and FIG. 13 show examples of flowcharts of the display adjustment process executed by the CPU 311, or executed by the GPU 312 based on an instruction from the CPU 311.

First, in step S1, the CPU 311 determines whether or not a predetermined input information for returning display adjustment of a stereo image to the default setting has been accepted from a user, by referring to the operation data 501. If the result of the determination is YES, the process proceeds to step S21. If the result of the determination is NO, the process proceeds to step S2.

In step S2, based on an instruction from the CPU 311, the GPU 312 acquires an image for left eye taken by the left stereo camera 23a and an image for right eye taken by the right stereo camera 23b which are updated every frame (for example, every 1/60 sec), by referring to the stereo camera data 502. Then, the process proceeds to step S3.

In step S3, the GPU 312 displays one of the image for left eye and the image for right eye acquired in step S2, on the display screen of the upper LCD 22 (in a planar visible manner). As a result, a user can view the scene taken by a non-stereo camera on the display screen of the upper LCD 22 in real time. Then, the process proceeds to step S4.

In step S4, the CPU 311 determines whether or not predetermined input information indicating that the shutter button (L-button 14G and R-button 14H) has been pressed has been accepted from a user, by referring to the operation data 501. If the result of the determination is YES, the process proceeds to step S6. If the result of the determination is NO, the process returns to step S2 (that is, processing of steps S2 and S3 is repeated until input information indicating that the shutter button has been pressed has been accepted).

In step S5, the CPU 311 causes the GPU 312 to perform translucency processing for one (here, the image for right eye) of the image for left eye and the image for right eye acquired in step S2, and then stores the image for left eye and the image for right eye as the stereo camera data 502 in the data storage area 500 (the stored images are used as adjustment images, that is, the image for left eye is used as the left adjustment image 50a, and the image for right eye is used as the right adjustment image 50b). Specifically, the GPU 312 changes the setting of the transparency of the right adjustment image 50b such that the right adjustment image 50b and the left adjustment image 50a can be both viewed even if these images overlap with each other. Then, the process proceeds to step S6.

In step S6, the GPU 312 displays the adjustment images (the left adjustment image 50a and the right adjustment image 50b) stored in step S5, in a planar visible manner, by referring to the stereo camera data 502. Specifically, the GPU 312 acquires the display parameter for adjusting the display position of the stereo image, by referring to the display parameter data 505. As previously described, if a user has already adjusted the display position of a stereo image, the value of the display parameter is equal to the value of the display adjustment parameter, and otherwise, the value of the display parameter is equal to the value of the default parameter. Then, the GPU 312 displays the left adjustment image 50a and the right adjustment image 50b which has been subjected to the translucency processing, on the display screen of the upper LCD 22, in a planar visible manner, based on the acquired display parameter (both images are displayed on the display screen in a planar visible manner, the parallax barrier being turned off by the CPU 311). Then, the process proceeds to step S7.

In step S7, the CPU 311 determines whether or not predetermined input information for moving the right adjustment image 50b displayed in a translucent manner has been accepted from a user, by referring to the operation data 501. Specifically, the CPU 311 determines whether or not a user has touched the up-down button 70 or the right-left button 71 (see FIG. 9 and FIG. 10) displayed on the lower LCD 12 with the touch pen 28 or the like. If the result of the determination is YES, the process proceeds to step S8. If the result of the determination is NO, the process proceeds to step S10 (see FIG. 13).

Figure 9:
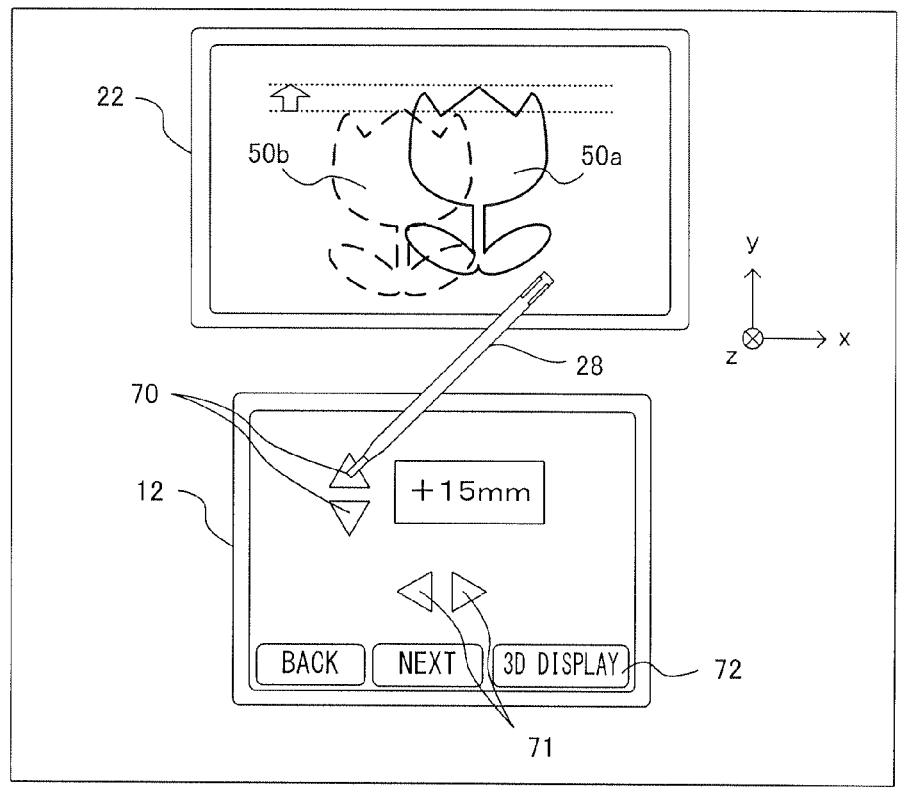
FIG. 9 shows a non-limiting example of movement of the display position of the adjustment image.

In step S8, the CPU 311 causes the GPU 312 to move the display position of the right adjustment image 50b displayed in a translucent manner, based on the operation data 501. Specifically, based on an instruction from the CPU 311, for example, if a user is touching the upper button of the up-down button 70, the GPU 312 moves the display position of the right adjustment image 50b upward, and if a user is touching the left button of the right-left button 71, the GPU 312 moves the display position of the right adjustment image 50b leftward. As shown in FIG. 9, the movement amount (for example, 15 mm) is specifically displayed on the lower LCD 12 in accordance with the user's touch to the up-down button 70. The GPU 312 moves the display position of the right adjustment image 50b upward or downward based on the movement amount. Therefore, it becomes easy for a user to perform fine adjustment of movement of the right adjustment image 50b in the upward or downward direction. Although in the present embodiment, the amount of movement in the upward or downward direction is displayed on the lower LCD 12, the exemplary embodiments are not limited thereto. Then, the process proceeds to step S9.

In step S9, the CPU 311 updates the vertical displacement data 503 to (stores as the vertical displacement data 503) the displacement in the vertical direction (y-axis direction) between the latest display position of the right adjustment image 50b, and the display position of the right adjustment image 50b displayed in step S6, based on data of movement instruction from a user for the right adjustment image 50b, which is included in the operation data 501. Then, the process proceeds to step S10 (see FIG. 13).

In step S10 (see FIG. 13), the CPU 311 determines whether or not predetermined input information for performing stereoscopically visible display has been accepted from a user, by referring to the operation data 501. Specifically, the CPU 311 determines whether or not a user has touched a 3D display button 72 (see FIG. 9 and FIG. 10) displayed on the lower LCD 12 with the touch pen 28 or the like. If the result of the determination is YES, the process proceeds to step S11. If the result of the determination is NO, the process proceeds to step S16.

In step S11, the CPU 311 calculates the display adjustment parameter, based on the vertical displacement data 503, and updates the display adjustment parameter data 506 to (stores as the display adjustment parameter data 506) the calculated display adjustment parameter. Then, the process proceeds to step S12.

Here, the calculation of the display adjustment parameter by the CPU 311 will be described. As previously described, the display position of a stereo image is corrected by the display parameter being corrected (changed). In addition, the relationship between the display parameter and the display position of a stereo image is defined by a known linear transform or the like. Therefore, if the degree to which the display position of a stereo image is to be changed is calculated, the degree to which the display parameter is to be changed can be calculated by linear transform. The CPU 311 calculates the degree to which the display position of a stereo image with respect to the vertical direction is to be changed, based on the vertical displacement (vertical displacement data 503) of the right adjustment image 50b moved in the vertical direction so as to align the display positions of the adjustment images (i.e., the subject 50 on these images) with respect to the vertical direction. Then, based on that calculation result, the CPU 311 calculates the degree to which the display parameter is to be changed (parameter change amount), by linear transform, and based on the parameter change amount, calculates the display adjustment parameter for correcting the display parameter.

In step S12, based on an instruction from the CPU 311, the GPU 312 acquires an image for left eye taken by the left stereo camera 23a and an image for right eye taken by the right stereo camera 23b which are updated every frame, by referring to the stereo camera data 502. Then, the process proceeds to step S13.

In step S13, the GPU 312 displays the images acquired in step S12 in a stereoscopically visible manner at the display positions corrected based on the display adjustment parameter. Specifically, the GPU 312 acquires the display adjustment parameter for correcting the display position of the stereo image, by referring to the display adjustment parameter data 506. Then, the GPU 312 displays both images on the display screen of the upper LCD 22 in a stereoscopically visible manner, based on the acquired display adjustment parameter. It is noted that the stereoscopically visible display is realized by the CPU 311 turning on the parallax barrier while the right eye of a user views the image for right eye and the left eye views the image for left eye. Thus, after the display positions of images taken by the left stereo camera 23a and the right stereo camera 23b are corrected, a user can actually confirm how the images are stereoscopically viewed, thereby confirming whether or not the correction is appropriate. Then, the process proceeds to step S14.

In step S14, the CPU 311 determines whether or not predetermined input information for ending the stereoscopically visible display has been accepted from a user, by referring to the operation data 501. If the result of the determination is YES, the process proceeds to step S15. If the result of the determination is NO, the process returns to step S12 (that is, processing of steps S12 and S13 is repeated until input information for ending the stereoscopically visible display is accepted).

In step S15, the GPU 312 displays the adjustment images in a planar visible manner again. Specifically, the GPU 312 displays again the adjustment images moved by the GPU 312 in step S7 on the display screen of the upper LCD 22 in a planar visible manner, based on the data of adjustment images stored as the stereo camera data 502, and the operation data 501 (that is, the adjustment images are displayed in a planar visible manner again at the display positions as they were just before the switching to the stereoscopically visible display). Then, the process proceeds to step S16.

In step S16, the CPU 311 determines whether or not predetermined input information for ending the adjustment (movement) of the adjustment images has been accepted from a user, by referring to the operation data 501. If the result of the determination is YES, the process proceeds to step S17. If the result of the determination is NO, the process returns to step S7 (see FIG. 12) to determine again whether or not input information for moving the adjustment images has been accepted from a user.

In step S17, the CPU 311 determines whether or not predetermined input information for ending the display adjustment mode has been accepted from a user, by referring to the operation data 501. If the result of the determination is YES, the process proceeds to step S18. If the result of the determination is NO, the process proceeds to step S20.

In step S18, the CPU 311 calculates the display adjustment parameter, based on the vertical displacement data 503. If the display adjustment parameter has not been changed from the value calculated in step S11, the value of the display adjustment parameter calculated in step S18 coincides with the value of the display adjustment parameter stored in the display adjustment parameter data 506. Then, the process proceeds to step S19.

In step S19, the CPU 311 updates the display parameter data 505 to (stores as the display parameter data 505) the display adjustment parameter calculated in step S18, and at the same time, stores the display adjustment parameter in the data storage internal memory 35. As a result, even if a user has switched off the game apparatus 10, when the game apparatus 10 has been powered on next time, the display adjustment parameter stored in the data storage internal memory 35 is stored as the display parameter data 505 in the main memory 32, whereby the display adjustment parameter is always reflected in the stereo camera imaging process. Then, the CPU 311 clears (resets) the data of the adjustment images stored in the stereo camera data 502, and clears (resets) the vertical displacement data 503 and the display adjustment parameter data 506, to end the display adjustment process.

On the other hand, in step S20, the CPU 311 clears (resets) the data of the adjustment images stored in the stereo camera data 502, and clears (resets) the vertical displacement data 503 and the display adjustment parameter data 506. Then, the process returns to step S1 (that is, if, for example, images (subject) determined as adjustment images by a user are difficult to see, processing for taking and determining images of another subject as adjustment images is started).

In step S21 shown in FIG. 12, the CPU 311 determines whether or not predetermined input information for performing stereoscopically visible display has been accepted from a user, by referring to the operation data 501. Specifically, the CPU 311 determines whether or not a user has touched the 3D display button 72 (see FIG. 9 and FIG. 10) displayed on the lower LCD 12 with the touch pen 28 or the like. If the result of the determination is YES, the process proceeds to step S22. If the result of the determination is NO, the process proceeds to step S25.

In step S22, based on an instruction from the CPU 311, the GPU 312 acquires an image for left eye taken by the left stereo camera 23a and an image for right eye taken by the right stereo camera 23b which are updated every frame, by referring to the stereo camera data 502. Then, the process proceeds to step S23.

In step S23, the GPU 312 displays the images acquired in step S22 in a stereoscopically visible manner at the display positions defaulted based on the default parameter. Specifically, the GPU 312 acquires the default parameter for defaulting the display position of the stereo image, by referring to the default parameter data 504. Then, the GPU 312 displays both images on the display screen of the upper LCD 22 in a stereoscopically visible manner, based on the acquired default parameter. It is noted that the stereoscopically visible display is realized by the CPU 311 turning on the parallax barrier while the right eye of a user views the image for right eye and the left eye views the image for left eye. Thus, after the display positions of images taken by the left stereo camera 23a and the right stereo camera 23b are defaulted, a user can actually confirm how the images are stereoscopically viewed, thereby confirming whether or not there is no problem if the display positions are defaulted. Then, the process proceeds to step S24.

In step S24, the CPU 311 determines whether or not predetermined input information for ending the stereoscopically visible display has been accepted from a user, by referring to the operation data 501. If the result of the determination is YES, the process proceeds to step S25. If the result of the determination is NO, the process returns to step S22 (that is, processing of steps S22 and S23 is repeated until input information for ending the stereoscopically visible display is accepted).

In step S25, the CPU 311 determines whether or not predetermined input information for ending the display adjustment mode has been accepted from a user, by referring to the operation data 501. If the result of the determination is YES, the process proceeds to step S26. If the result of the determination is NO, the process returns to step S1 (that is, the display adjustment process is restarted).

In step S26, the CPU 311 updates the display parameter data 505 to (stores as the display parameter data 505) the default parameter stored as the default parameter data 504, and if the display adjustment parameter has been stored in the data storage internal memory 35, clears (resets) the stored display adjustment parameter. Then, the CPU 311 ends the adjustment process. As a result, even if a user has switched off the game apparatus 10, when the game apparatus 10 has been powered on next time, the default parameter is stored as the display parameter data 505 because only the default parameter has been stored in the data storage internal memory 35, whereby the default parameter is always reflected in the stereo camera imaging process.

As described thus far, in the present embodiment, in the case where a user manually adjusts the display positions of the adjustment images (NO in step S1), two images (stereo image) of any imaging target (subject) taken by the two cameras of the stereo camera are acquired and displayed in a planar visible manner (steps S2 and S3). Therefore, by selecting a desired image and pressing the shutter button while viewing the images displayed in a planar visible manner (step S4), a user can display adjustment images on the display screen in a planar visible manner (steps S5 and S6). Therefore, a user does not need to separately prepare a specific pattern image or the like for adjustment. In addition, of the adjustment images, the right adjustment image 50b is displayed in a translucent manner (step S5). Therefore, a user can easily and visually recognize displacement between the positions of the right adjustment image 50b and the left adjustment image 50a. Moreover, by performing an operation for moving the right adjustment image 50b (YES in step S7), a user can easily align (adjust) the display position of the right adjustment image 50b with the display position of the left adjustment image 50a (step S8). Here, of the movement information about the right adjustment image 50b, only movement information (displacement) with respect to the vertical direction which is used for calculation of the display adjustment parameter is stored (step S9), but a user can move the right adjustment image 50b in both vertical direction and horizontal direction. Therefore, a user can substantially overlap the right adjustment image 50b with the left adjustment image 50a by moving the right adjustment image 50b. As a result, it becomes easy to align the display positions of the two images with respect to the vertical direction. In addition, the displacement in the vertical direction is updated every time a user performs an operation of the movement. If a user performs an operation for performing stereoscopic display (YES in step S10), the display adjustment parameter is calculated based on the displacement (step S11), and the stereo image is displayed in a stereoscopically visible manner, based on the calculated display adjustment parameter (steps S12 and 13). Therefore, when a user is adjusting the display position of the right adjustment image 50b (that is, during the adjustment), the user can actually confirm how the stereo image is displayed in a stereoscopically visible manner by the current adjustment, and can confirm whether or not the current adjustment is appropriate, before ending (determining) the adjustment. Then, if a user has performed an operation of ending the adjustment (YES in step S17), the display adjustment parameter is calculated based on the displacement in the vertical direction of the right adjustment image 50b moved thus far (step S18), and the display parameter for determining the display position of a stereo image is updated to the value of the calculated display adjustment parameter (step S19). Thus, a user can set the display parameter to an appropriate value (display adjustment parameter) by only aligning (adjusting) the display positions of the adjustment images while confirming the display screen. In addition, if a user defaults the display position of a stereo image (YES in step S1), the display parameter is set at the value of the default parameter (step S26). Therefore, even in the case where the display position of a stereo image has been previously changed (adjusted) by a user, it is possible to return the display position to the default setting any time. After the display parameter is updated (set) in the display adjustment mode (display adjustment process) as described above, when a stereo image is taken in the stereo imaging mode (stereo imaging process), the display parameter updated in the display adjustment process is loaded, whereby an appropriate stereo image is displayed in a stereoscopically visible manner in which displacement in the vertical direction, which can cause a user to recognize the stereo image as two images displaced from each other, has been corrected.

(Modifications)

Figure 14:
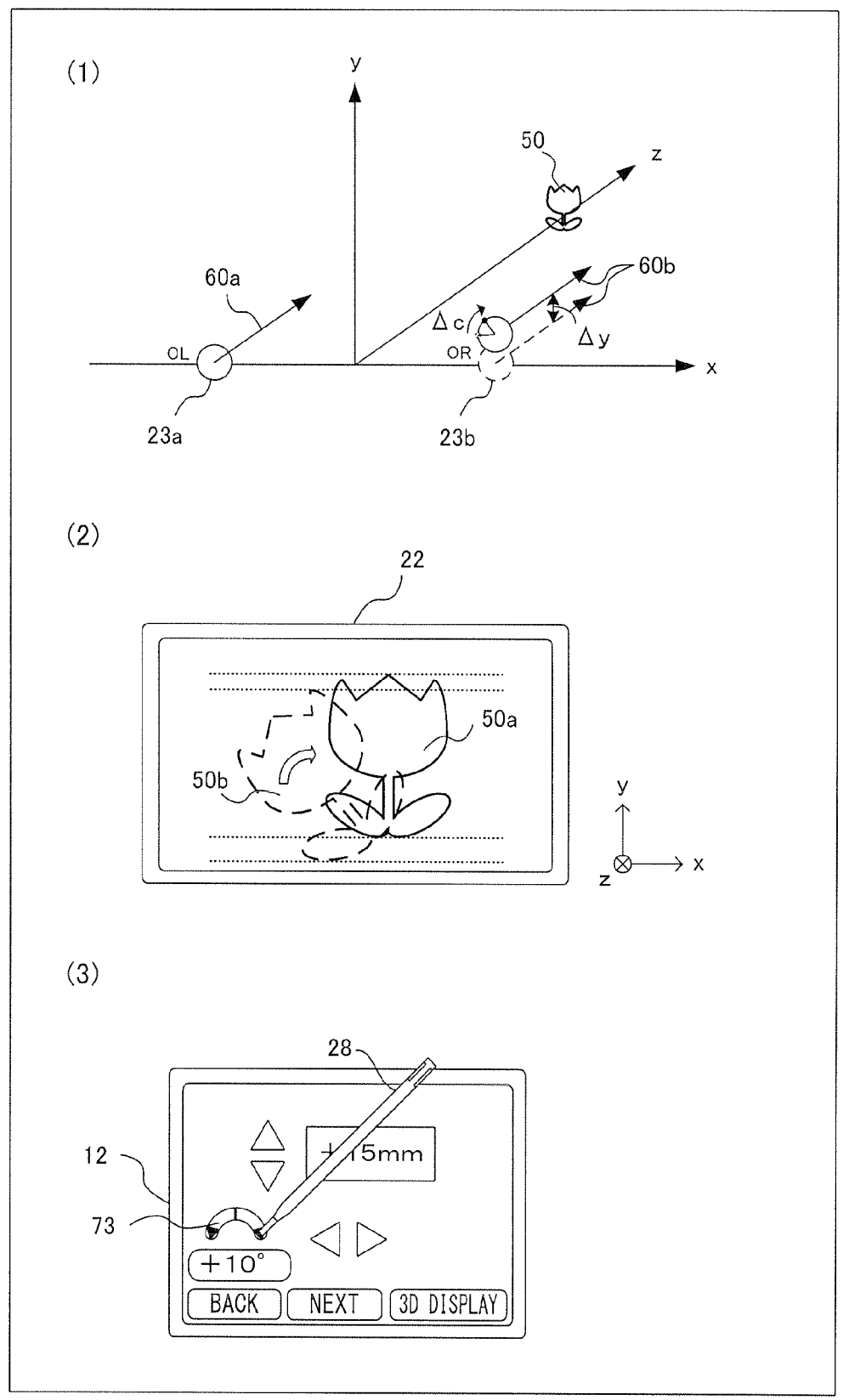
FIG. 14 shows a non-limiting example of displacement between the display position of the adjustment images.

In the above embodiment, the right adjustment image 50b can be moved also in the x-axis direction (horizontal direction) when the adjustment images (the left adjustment image 50a and the right adjustment image 50b) are adjusted so as to remove displacement in the vertical direction (y-axis direction). However, instead of or in addition to the above configuration, the right adjustment image 50b may be rotatable around the z-axis direction (on the xy plane) (see part (2) of FIG. 14). Specifically, as shown in part (1) of FIG. 14, in the case where rotational displacement of the right stereo camera 23b by $\Delta c$ around the z-axis direction has occurred, rotational displacement occurs on the right adjustment image 50b displayed on the display surface (see part (2) of FIG. 14). In this case, when a user performs adjustment for removing displacement in the y-axis direction between both images, it is impossible to cause the display positions of the subject 50 on both images to perfectly coincide with each other. Therefore, depending images (subject), it may be difficult to perform accurate adjustment for removing the displacement in the y-axis direction. However, as shown in part (3) of FIG. 14, a user can rotate the right adjustment image 50b displayed in a translucent manner around the x-axis direction (on the xy plane) by touching a rotation button 73 displayed on the lower LCD 12. Thus, by rotating the right adjustment image 50b, a user can cause the display positions of an imaging target (subject 50) on the right adjustment image 50b and the left adjustment image 50a to substantially coincide with each other. As a result, a user can perform accurate adjustment for removing the displacement in the y-axis direction between the right adjustment image 50b and the left adjustment image 50a. It is noted that, in this case, in step S9 in FIG. 12, data indicating displacement by the rotational adjustment is also stored in the data storage area 500, and in steps S11 and S18 in FIG. 13, a display adjustment parameter based on the displacement by the rotational adjustment is also calculated. That is, the rotational displacement on the stereo image (both images), which is displayed in a stereoscopically visible manner based on the calculated display adjustment parameter, is also corrected.

Figure 15:
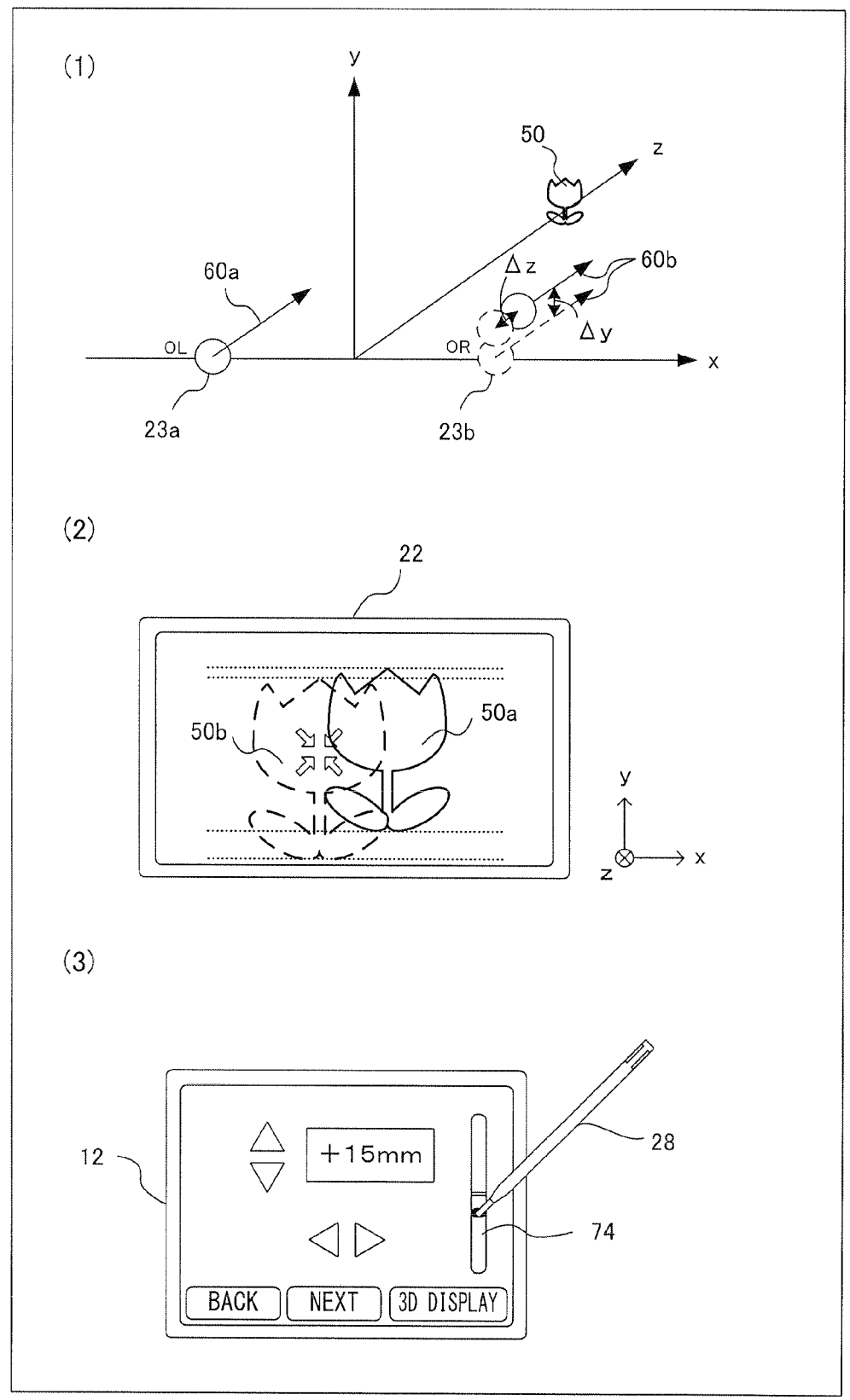
FIG. 15 shows a non-limiting example of displacement between the display position of the adjustment images.

In the above embodiment, the right adjustment image 50b can be moved also in the x-axis direction (horizontal direction), and/or rotated around the z-axis direction (on the xy plane). However, instead of or in addition to the above configuration, zooming adjustment may be able to be performed for the right adjustment image 50b (see part (2) of FIG. 15). Specifically, as shown in part (1) of FIG. 15, in the case where translational displacement of the right stereo camera 23b by $\Delta z$ in z-axis direction has occurred, the size of a subject changes on the right adjustment image 50b displayed on the display surface (see part (2) of FIG. 15). In this case, when a user performs adjustment for removing displacement in the y-axis direction between two images, the user cannot cause the display positions of the subject 50 on the two images to perfectly coincide with each other. Therefore, depending images (subject), it may be difficult to perform accurate adjustment for removing the displacement in the y-axis direction. However, as shown in part (3) of FIG. 15, a user can zoom (enlarge or contract) the right adjustment image 50b displayed in a translucent manner, by touching a zoom button 74 displayed on the lower LCD 12. Thus, by zooming the right adjustment image 50b, a user can cause the display positions of an imaging target (subject 50) on the right adjustment image 50b and the left adjustment image 50a to substantially coincide with each other. As a result, a user can perform accurate adjustment for removing the displacement in the y-axis direction between the right adjustment image 50b and the left adjustment image 50a. It is noted that, in this case, in step S9 in FIG. 12, data indicating the degree of the zooming is also stored in the data storage area 500, and in steps S11 and S18 in FIG. 13, a display adjustment parameter based on the degree of the zooming is also calculated. That is, the size difference on the stereo image (both images), which is displayed in a stereoscopically visible manner based on the calculated display adjustment parameter, is also corrected.

In the above embodiment, adjustment for change in the angle of view of the stereo camera has not been described. However, in the case where the angle of view has changed owing to change in the focal distance of the right stereo camera 23b, the size of a subject on the right adjustment image 50b changes. Also in this case, a user may perform zooming adjustment for the right adjustment image 50b as described above.

In the above embodiment, every time a user performs an operation for moving the right adjustment image 50b (YES in step S7 in FIG. 12), the vertical displacement data 503 is updated to the displacement by the movement in the vertical direction (y-axis direction) of the display position of the right adjustment image 50b (the displacement is stored as the vertical displacement data 503) (step S9 in FIG. 12). However, instead, every time a user performs an operation for moving the right adjustment image 50b, the CPU 311 may store the latest display position of the right adjustment image 50b as predetermined data in the data storage area 500 (the predetermined data may be updated to the latest display position) in step S9. In this case, if a user performs an operation for stereoscopically visible display (YES in step S10 in FIG. 19), in step S11, the CPU 311 calculates the display adjustment parameter, based on the displacement in the vertical direction between the latest display position of the right adjustment image 50b updated in step S9 and the display position of the right adjustment image 50b displayed in step S6.

In the above embodiment, the right adjustment image 50b displayed in a translucent manner can be moved in accordance with an operation by a user. However, instead, the left adjustment image 50a which is not displayed in a translucent manner may be able to be moved.

In the above embodiment, the right adjustment image 50b is displayed in a translucent manner. However, both the right adjustment image 50b and the left adjustment image 50a may be displayed in a translucent manner or may be displayed in a non-translucent manner (that is, normally displayed), as long as the visibilities of both images are secured.

In the above embodiment, only the right adjustment image 50b displayed in a translucent manner can be moved by a user's operation. However, both the right adjustment image 50b and the left adjustment image 50a may be able to be moved by a user's operation. In this case, the vertical displacement data 503 may be determined based on the displacement of the right adjustment image 50b relative to the left adjustment image 50a in the vertical direction (y-axis direction).

In the above embodiment, the display position of the right adjustment image 50b is corrected based on displacement of the optical position of the right stereo camera 23b relative to the left stereo camera 23a (that is, displacement of the right adjustment image 50b relative to the left adjustment image 50a). However, instead, predetermined reference optical positions may be set for respective cameras of the stereo camera (that is, predetermined reference positions may be set for the respective images). Then, by moving both images, the display positions of the images may be corrected based on respective displacements of the images from the predetermined reference positions.

In the above embodiment, one of an image for left eye and an image for right eye is displayed in a planar visible manner, for acquisition of adjustment images (step S3 in FIG. 12). However, instead, a stereoscopically visible image may be displayed on the display screen of the upper LCD 22, for acquisition of adjustment images. That is, in step S3, the GPU 312 may display the two images acquired in step S2, in a stereoscopically visible manner, based on the display parameter. In this case, a user selects a desired imaging target and presses the shutter button while viewing a stereoscopically visible image displayed on the upper LCD 22, thereby determining the stereoscopically visible image to be adjustment images.

In the above embodiment, in the display adjustment process (see FIG. 12), stereoscopically visible display can be performed also when the display parameter is set (returned) to the default parameter (YES in step S1) (steps S21 to S24). However, stereoscopically visible display may not be performed when the display parameter is returned to the default parameter. That is, processing of steps S21 to S24 may be omitted.

In the above embodiment, in the stereo camera imaging mode, the mode may be freely switched to the display adjustment mode, and the mode may automatically return (switch) to the stereo camera imaging mode when the display adjustment mode has ended.

In the above embodiment, the right adjustment image 50b can be moved by a user touching a button or the like on the touch panel displayed on the display screen of the lower LCD 12. However, instead, the right adjustment image 50b may be able to be moved by the operation buttons 14A to 14L being operated.

In the above embodiment, a stereoscopically visible image displayed on the upper LCD 22 is stereoscopically viewed with naked eyes. However, other types of images may be displayed on the upper LCD 22 as long as they are stereoscopically viewed. For example, a stereoscopically visible image displayed on the upper LCD 22 may be stereoscopically viewed by a user wearing glasses for stereoscopic viewing (that is, for example, an image for left eye and an image for right eye may be alternately displayed in a time-sharing manner).

In the above embodiment, the imaging directions of the outer imaging section (left) 23a and the outer imaging section (right) 23b are in parallel, and images of a subject are taken by a parallel method. However, instead, for example, the imaging directions of those imaging sections may not be in parallel but may be crossed, and images of a subject may be taken by a cross method.

In the above embodiment, the display adjustment parameter is stored in the data storage internal memory 35. However, instead, the display adjustment parameter may be stored in an external (detachable) nonvolatile memory or the like. In the above embodiment, in the display adjustment process (see FIG. 12 and FIG. 13), the main memory 32 is referred to for the data of various parameters and the like. However, instead, data in a cache memory may be referred to or updated.

In the above embodiment, the game apparatus 10 as an example of the imaging apparatus will be described. For example, portable information terminal apparatuses such as mobile phones, personal handy-phones (PHS), or PDAs may be used. Alternatively, stationary game apparatuses, personal computers, or the like may be used.

Also, while, in the above embodiment, the above described processes are executed by one game apparatus 10, the processes may be divided and performed by a plurality of apparatuses communicatively connected by wire or wirelessly to each other.

In addition, in the above embodiment, the shape of the game apparatus 10, the shapes, numbers, installation positions of the various operation buttons 14, the touch panel 13, and the like which are provided on the game apparatus 10 are merely illustrative example. Other shapes, numbers and installation positions may be employed. The processing orders used for the above-described information processing, setting values, values used for determination, and the like are merely illustrative example. Other processing orders and values may be used.

The various information processing programs executed in the game apparatus 10 of the present embodiment described above may be provided to the game apparatus 10 through not only a storage medium such as the external memory 44 but also through a wired or wireless communication line. Alternatively, the programs may be prestored in a nonvolatile storage apparatus (such as the internal data storage memory 35) provided in the game apparatus 10. It should be noted that an information storage medium for storing the programs may be an nonvolatile memory as well as a CD-ROM, a DVD, and a like optical disc-shaped storage media, a flexible disc, a hard disc, a magneto-optical disc, a magnetic tape, and the like. Further, an information storage medium for storing the programs may be a volatile memory which temporarily stores the programs.

While the exemplary embodiments have been described in detail, the foregoing description is in all aspects illustrative and not restrictive. It will be understood that numerous other modifications and variations can be devised.

What is claimed is:

1. A non-transitory computer-readable storage medium having stored therein an information processing program which is executable by a computer of an imaging apparatus configured to take an image by a stereo camera to acquire a stereoscopically viewable taken image and that includes storage, the information processing program, when executed, causing the computer to perform operations comprising:
   selectively switching between a first mode and a second mode;
   in the first mode:
      taking an image of a given imaging target by the stereo camera, and acquiring an image taken by a first camera of the stereo camera, as a first temporary taken image, and an image taken by a second camera of the stereo camera, as a second temporary taken image;
      displaying the first temporary taken image and the second temporary taken image on a display;
      changing a display position of at least one of the first temporary taken image and the second temporary taken image in one or both of a first direction corresponding to a parallax direction, and a second direction orthogonal to the first direction, based on a first input accepted from a user in the first mode;
      calculating a correction value for correcting a display position, on the display, of at least one of an image taken by the first camera and an image taken by the second camera, based only on displacement in the second direction of the display position of at least one of the first temporary taken image and the second temporary taken image; and
      storing, in the storage, the calculated correction value without associating the correction value with the first temporary taken image and the second temporary taken image; and
   in the second mode:
      first, based on the calculated correction value stored in the storage in the first mode, correcting a display position on the display, in the second direction, of at least one of a first image taken by the first camera and a second image taken by the second camera;
      second, based on a second input accepted from the user in the second mode, correcting a display position on the display, in the first direction, of at least one of the first image and the second image; and
      displaying the first image and the second image on the display in a stereoscopically visible manner, based on the corrected display positions.

2. The non-transitory computer-readable storage medium according to claim 1, wherein
   a display parameter for determining the display positions of the first image and the second image on the display is stored in the storage,
   the first temporary taken image and the second temporary taken image on the display are displayed based on the display parameter, and
   the display position of at least one of the first image and the second image on the display is corrected based on the display parameter corrected based on the correction value.

3. The non-transitory computer-readable storage medium according to claim 2, wherein
   the information processing program further causes the computer to perform:
   determining the display position of at least one of the first temporary taken image and the second temporary taken image, based on a determination input accepted from the user; and
   calculating a display adjustment parameter for correcting the display position of at least one of the first image and the second image on the display,
   updating the display parameter to the value of the display adjustment parameter, and storing the updated display parameter in the storage,
   the display position of the first temporary taken image is changed based on the first input accepted from the user in the first mode,
   the display position of the first temporary taken image is determined to be the changed display position of the first temporary taken image, based on the determination input,
   the display adjustment parameter is calculated based on a first displacement which is a displacement between the determined display position of the first temporary taken image and the display position of the first temporary taken image as it was before changing the display position, and
   the display position of at least one of the first image and the second image on the display is corrected based on the updated display parameter stored in the storage.

4. The non-transitory computer-readable storage medium according to claim 3, wherein
   the display position of the second temporary taken image is changed based on a third input accepted from the user in the first mode, the display positions of the first temporary taken image and the second temporary taken image are determined to be the changed display positions based on the determination input, and the display adjustment parameter is calculated based on the first displacement, and a second displacement which is a displacement between the display position of the second temporary taken image and the display position of the second temporary taken image as it was before the display position change.

5. The non-transitory computer-readable storage medium according to claim 4, wherein
the display adjustment parameter is calculated based on a relative displacement of the first displacement with respect to the second displacement.

6. The non-transitory computer-readable storage medium according to claim 4, wherein
the display adjustment parameter is calculated based on only a displacement in the second direction of the first displacement and a displacement in the second direction of the second displacement.

7. The non-transitory computer-readable storage medium according to claim 3, wherein
the display adjustment parameter is calculated based on only a displacement in the second direction of the first displacement.

8. The non-transitory computer-readable storage medium according to claim 3, wherein
the changed display position of the first temporary taken image is stored in storage every time the first input is accepted, and
when a switching input is accepted,
the display adjustment parameter is calculated based on a third displacement which is a displacement between the display position of the first temporary taken image stored in the storage and the display position of the first temporary taken image as it was before the position change, and
the first image and the second image are displayed on the display in a stereoscopically visible manner, based on the calculated display adjustment parameter.

9. The non-transitory computer-readable storage medium according to claim 8, wherein
the display position of the second temporary taken image is changed based on a third input accepted from the user in the first mode,
the changed display position of the second temporary taken image is stored in storage every time the third input is accepted, and
when the switching input is accepted,
the display adjustment parameter is calculated based on the third displacement and a fourth displacement which is a displacement between the display position of the second temporary taken image stored in the storage and the display position of the second temporary taken image as it was before the position is changed, and
the first image and the second image are displayed on the display in a stereoscopically visible manner, based on the calculated display adjustment parameter.

10. The non-transitory computer-readable storage medium according to claim 3, wherein
a default parameter that defines predetermined default display positions of the first image and the second image on the display is stored in advance in the storage, and
when a defaulting input is accepted form the user, the display parameter is updated to the value of the default parameter and the updated display parameter is stored in the storage.

11. The non-transitory computer-readable storage medium according to claim 1, wherein
the first temporary taken image and the second temporary taken image are displayed on the display such that at least one of the first temporary taken image and the second temporary taken image is displayed in a translucent manner.

12. The non-transitory computer-readable storage medium according to claim 1, wherein
the first temporary taken image and the second temporary taken image are displayed on the display in a planar visible manner.

13. An imaging apparatus configured to take an image by a stereo camera to acquire a stereoscopically viewable taken image and that includes storage, the imaging apparatus comprising at least one processor being configured to:
selectively switch between a first mode and a second mode;
in a first mode:
take an image of a given imaging target by the stereo camera and acquire an image taken by a first camera of the stereo camera, as a first temporary taken image, and an image taken by a second camera of the stereo camera, as a second temporary taken image;
display the first temporary taken image and the second temporary taken image on a display;
change a display position of at least one of the first temporary taken image and the second temporary taken image in one or both of a first direction corresponding to a parallax direction and a second direction orthogonal to the first direction, based on a first input accepted from a user in the first mode;
calculate a correction value for correcting a display position, on the display, of at least one of an image taken by the first camera and an image taken by the second camera, based only on displacement in the second direction of the display position of at least one of the first temporary taken image and the second temporary taken image; and
store, in the storage, the calculated correction value without associating the correction value with the first temporary taken image and the second temporary taken image;
in the second mode:
first, based on the calculated correction value stored in the storage in the first mode, correct a display position on the display, in the second direction, of at least one of a first image taken by the first camera and a second image taken by the second camera;
second, based on a second input accepted from the user in the second mode, correct a display position on the display, in the first direction, of at least one of the first image and the second image; and
display the first image and the second image on the display in a stereoscopically visible manner, based on the corrected display positions.

14. An imaging system comprising:
a stereo camera to acquire a stereoscopically viewable taken image;
a display;
storage; and
at least one processor coupled to the stereo camera, the display and the storage, the at least one processor being configured to:

selectively switch between a first mode and a second mode;
in a first mode:
- take an image of a given imaging target by the stereo camera, and acquire an image taken by a first camera of the stereo camera, as a first temporary taken image, and an image taken by a second camera of the stereo camera, as a second temporary taken image;
- display the first temporary taken image and the second temporary taken image on the display;
- change a display position of at least one of the first temporary taken image and the second temporary taken image in one or both of a first direction corresponding to a parallax direction and a second direction orthogonal to the first direction, based on a first input accepted from a user in the first mode;
- calculate a correction value for correcting a display position, on the display, of at least one of an image taken by the first camera and an image taken by the second camera, based only on displacement in the second direction of the display position of at least one of the first temporary taken image and the second temporary taken image; and
- store, in the storage, the correction value calculated without associating the correction value with the first temporary taken image and the second temporary taken image;

in the second mode:
- first, based on the calculated correction value stored in the storage in the first mode, correct a display position on the display, in the second direction, of at least one of a first image taken by the first camera and a second image taken by the second camera;
- second, based on a second input accepted from the user in the second mode, correct a display position on the display, in the first direction, of at least one of the first image and the second image; and
- display the first image and the second image on the display in a stereoscopically visible manner, based on the corrected display positions.

15. An imaging method for taking an image by a stereo camera to acquire a stereoscopically viewable taken image, the imaging method comprising:
switching between a first mode and a second mode;
in the first mode:
- taking an image of a given imaging target by the stereo camera, and acquiring an image taken by a first camera of the stereo camera, as a first temporary taken image, and an image taken by a second camera of the stereo camera, as a second temporary taken image;
- displaying the first temporary taken image and the second temporary taken image on a display;
- changing a display position of at least one of the first temporary taken image and the second temporary taken image in one or both of a first direction corresponding to a parallax direction and a second direction orthogonal to the first direction, based on a first input accepted from a user in the first mode;
- calculating a correction value for correcting a display position, on the display, of at least one of an image taken by the first camera and an image taken by the second camera, based only on displacement in the second direction of the display position of the first temporary taken image and the second temporary taken image; and
- storing, in the storage, the calculated correction value without associating the correction value with the first temporary taken image and the second temporary taken image;

in the second mode:
- first, based on the calculated correction value stored in the storage in the first mode, correcting a display position on the display, in the second direction, of at least one of a first image taken by the first camera and a second image taken by the second camera;
- second, based on a second input accepted from the user in the second mode, correcting a display position on the display, in the first direction, of at least one of the first image and the second image; and
- displaying the first image and the second image on the display in a stereoscopically visible manner, based on the corrected display positions.

16. An information processing system, comprising:
a stereo camera comprising left and right cameras;
a memory;
a display for displaying stereoscopic images;
one or more input devices for receiving user-supplied inputs; and
processing circuitry in communication with the stereo camera, the memory, the display and the input devices, wherein
the information processing apparatus is operable in a display adjustment mode and in a stereo imaging mode,
in the display adjustment mode, the processing circuitry controls the display to stereoscopically display first left and right images captured by the left and right cameras, respectively, and adjusts a display position on the display of one or both of the first left and right images in one or both of a first direction corresponding to a parallax direction and a second direction orthogonal to the first direction, in response to first image adjustments inputs supplied to the input devices in the display adjustment mode, determines a correction value based only on the adjusted display position in the second direction and stores the correction value in the memory without association to the first left and right images, and
in the stereo imaging mode, the processing circuitry controls the display to stereoscopically display second left and right images captured by the left and right cameras, respectively, display positions of one or both of the second left and right images, first being corrected in the second direction based, at least in part, on the correction value stored in the storage in the display adjustment mode, and, second being corrected in the first direction based on second image adjustments inputs supplied to the input devices in the stereo imaging mode.

17. The information processing system according to claim 16, wherein the stereo camera, the memory, the display, the one or more input devices and the processing circuitry are part of a mobile telephone.

18. The information processing system according to claim 16, wherein the stereo camera, the memory, the display, the one or more input devices and the processing circuitry are part of a portable game apparatus.

19. The information processing system according to claim 16, wherein the display comprises a touchscreen.

20. The information processing system according to claim 16, wherein the memory stores a default display parameter for determining a default display position of one or both of the second left and right images, and the correction value corrects the default display parameter.

* * * * *